United States Patent
Yoshizumi et al.

(10) Patent No.: US 9,716,831 B2
(45) Date of Patent: Jul. 25, 2017

(54) IMAGING CONTROL APPARATUS, IMAGING CONTROL METHOD, AND PROGRAM

(75) Inventors: Shingo Yoshizumi, Tokyo (JP); Akira Shiga, Tokyo (JP); Tsukasa Kirisawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 786 days.

(21) Appl. No.: 13/161,638

(22) Filed: Jun. 16, 2011

(65) Prior Publication Data

US 2012/0002075 A1    Jan. 5, 2012

(30) Foreign Application Priority Data

Jul. 5, 2010    (JP) .................................. 2010-152909

(51) Int. Cl.
*H04N 5/232*    (2006.01)
*H04N 5/235*    (2006.01)
*H04N 5/225*    (2006.01)

(52) U.S. Cl.
CPC ....... *H04N 5/23245* (2013.01); *H04N 5/2251* (2013.01); *H04N 5/2352* (2013.01)

(58) Field of Classification Search
CPC ........... H04N 5/23245; H04N 5/23219; H04N 5/23222; H04N 1/215; H04N 5/2352; G03B 17/561
USPC .................... 348/229.1, 222.1, 362, 169, 143
See application file for complete search history.

(56) References Cited

U.S. PATENT DOCUMENTS

| | | | |
|---|---|---|---|
| 7,012,638 B1* | 3/2006 | Yokonuma | 348/220.1 |
| 2009/0102942 A1* | 4/2009 | Yoshizumi et al. | 348/222.1 |
| 2009/0103778 A1 | 4/2009 | Yoshizumi et al. | |
| 2009/0251549 A1* | 10/2009 | Meguro et al. | 348/208.4 |
| 2010/0171846 A1* | 7/2010 | Wood | H04N 1/00323 348/231.99 |
| 2010/0189358 A1* | 7/2010 | Kaneda et al. | 382/195 |
| 2011/0181687 A1 | 7/2011 | Yoshizumi | |
| 2011/0181690 A1 | 7/2011 | Yoshizumi | |
| 2011/0216159 A1 | 9/2011 | Yoshizumi | |
| 2011/0216225 A1 | 9/2011 | Yoshizumi | |
| 2012/0062691 A1* | 3/2012 | Fowler | F16M 11/10 348/36 |

FOREIGN PATENT DOCUMENTS

| | | | |
|---|---|---|---|
| JP | 2009-055410 A | 3/2009 | |
| JP | 2009-100300 A | 5/2009 | |

* cited by examiner

*Primary Examiner* — Paul Berardesca
(74) *Attorney, Agent, or Firm* — Chip Law Group

(57) ABSTRACT

An imaging apparatus including a mode sequence control unit configured to select a control scheme for a still image recording operation in accordance with an imaging operation setting, wherein the mode sequence control unit is configured to select a first control scheme when the imaging operation setting is a normal imaging setting and a second, different control scheme when the imaging operation setting is an unconscious imaging setting.

22 Claims, 17 Drawing Sheets

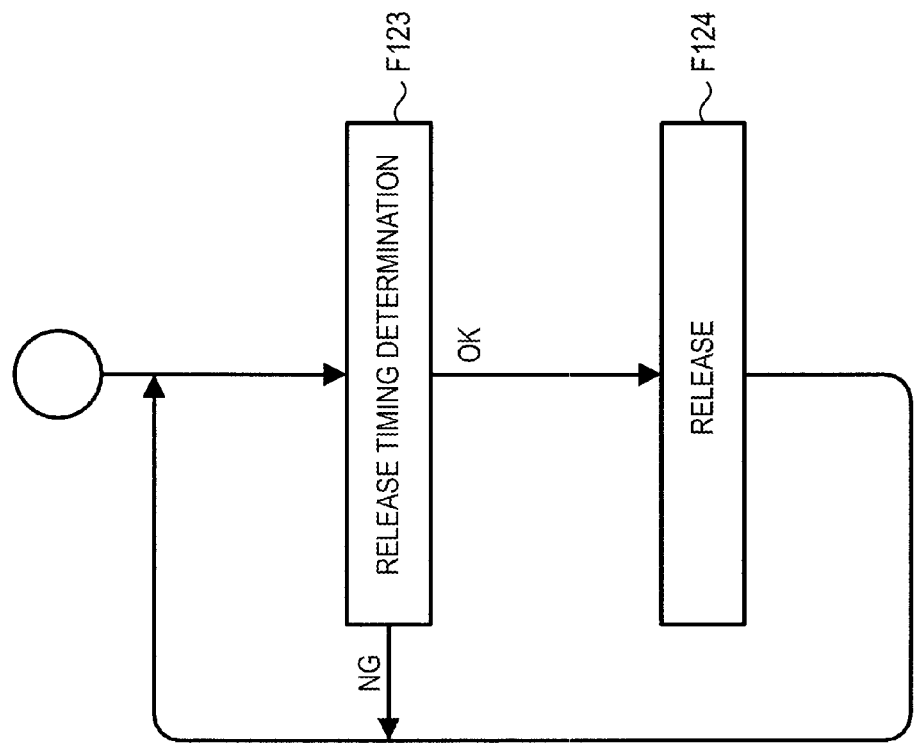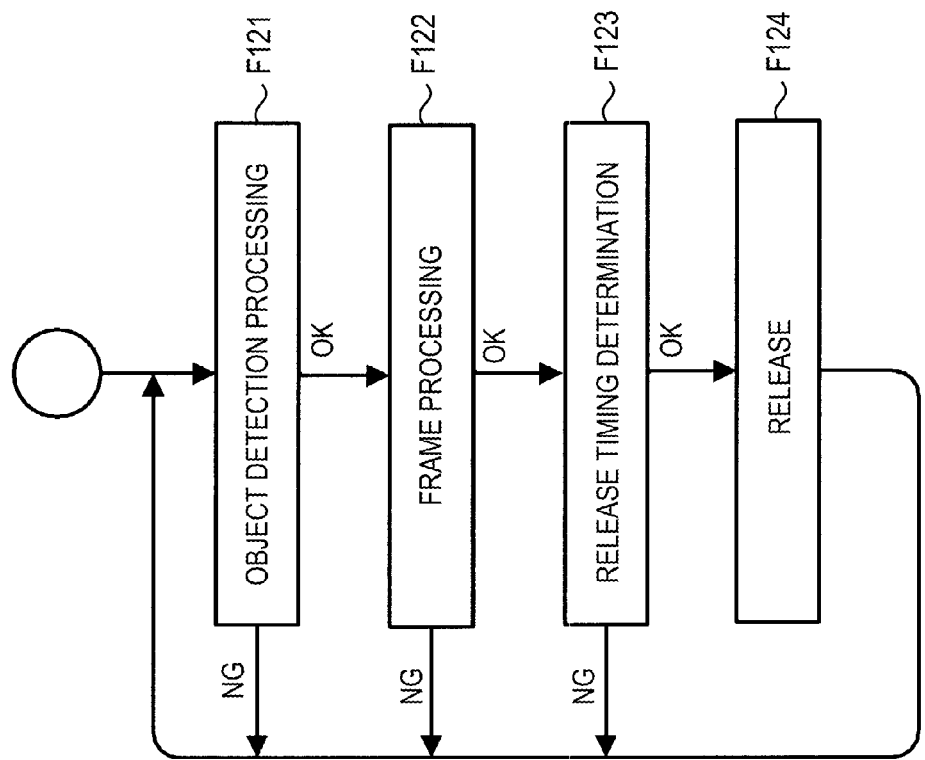

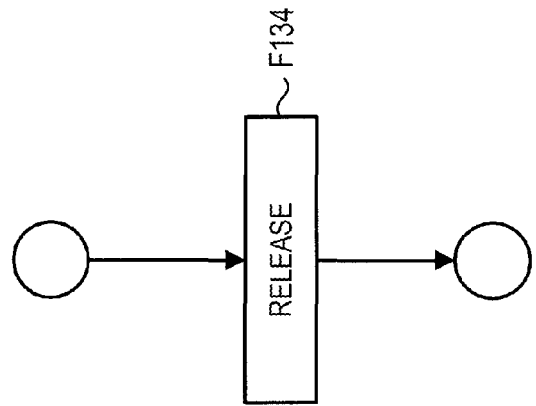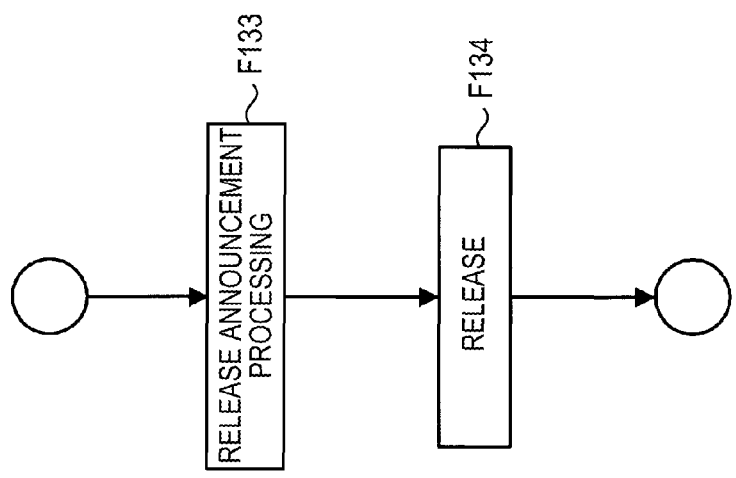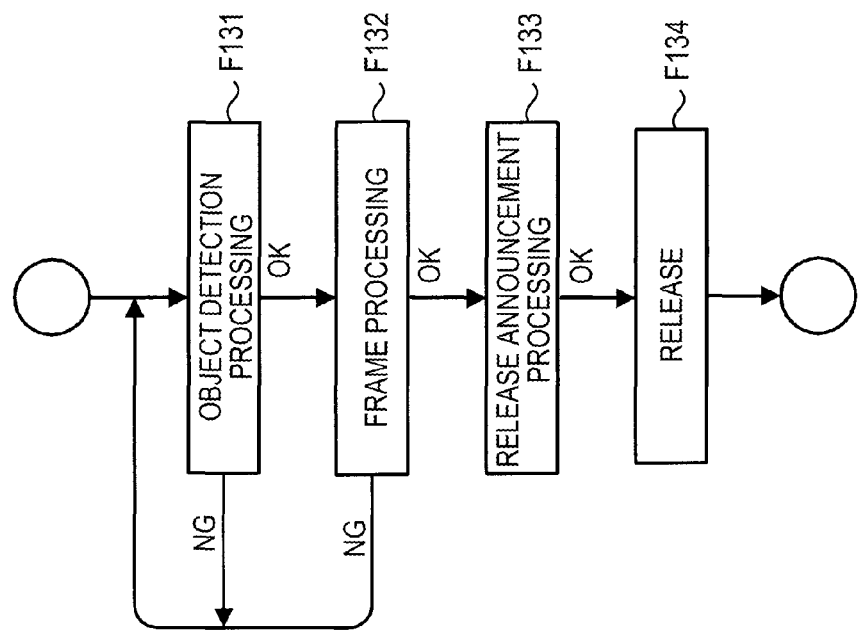

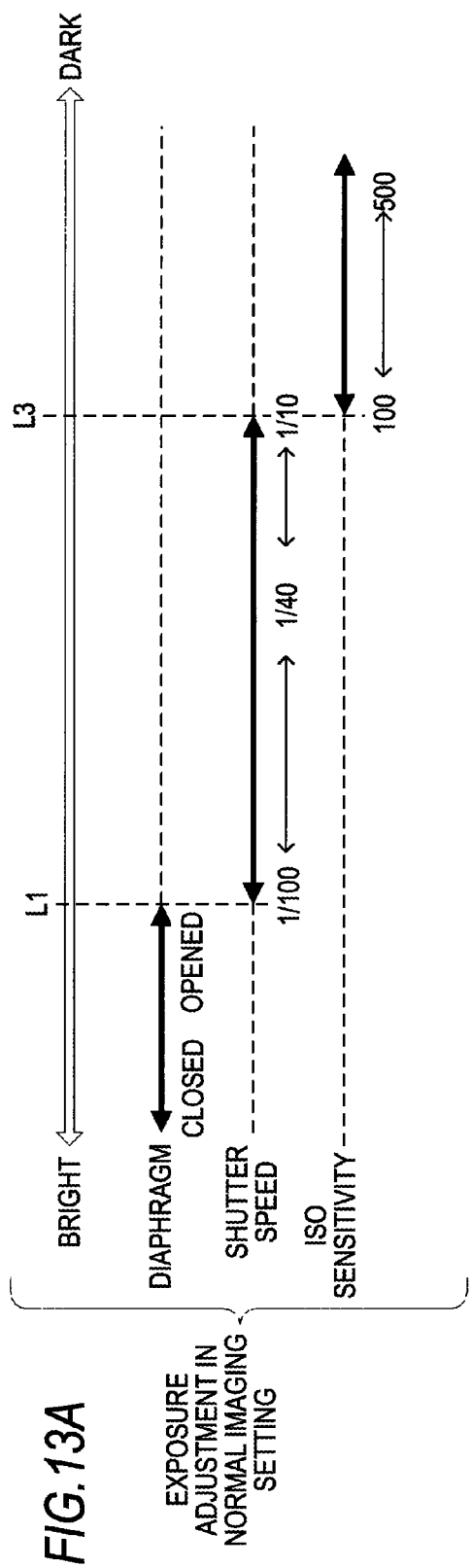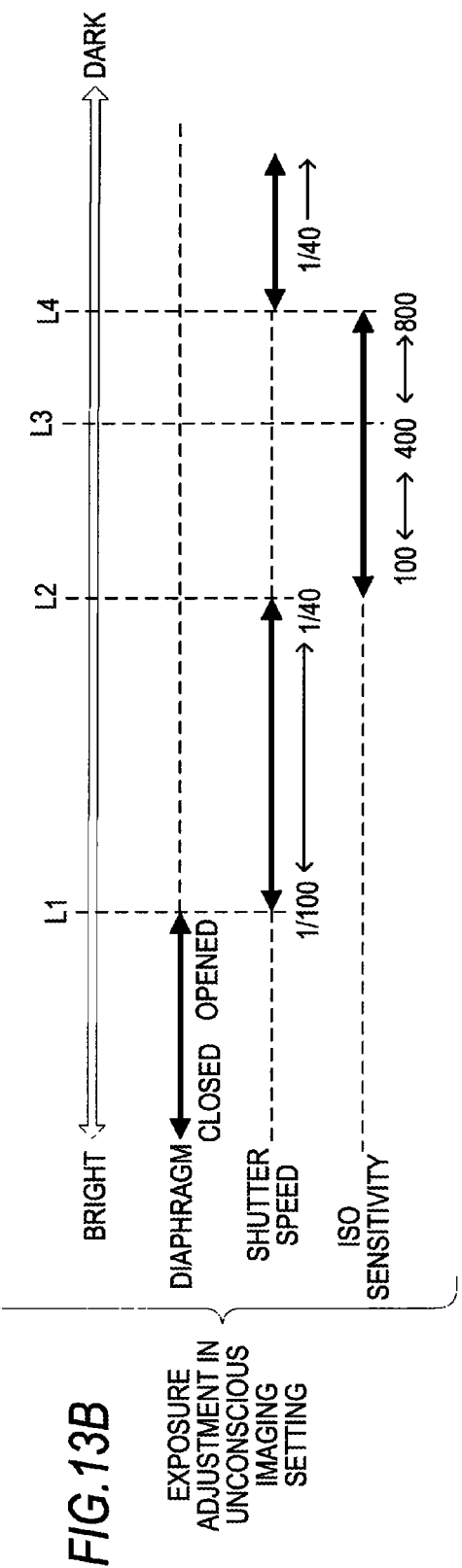

IMAGING CONTROL APPARATUS, IMAGING CONTROL METHOD, AND PROGRAM

FIELD

The present disclosure relates to an imaging apparatus which automatically captures a stationary image, an imaging control apparatus for an imaging system, and an imaging control method. In addition, the present disclosure relates to a program which implements the imaging control apparatus and the imaging control method.

BACKGROUND

JP-A-2009-100300 discloses techniques for automatic composition matching and automatic recording of a captured image obtained by the automatic composition matching using an imaging system provided with a digital still camera and a camera platform which electrically changes the panning/tilting directions of the digital still camera.

According to the technique disclosed in JP-A-2009-100300, a person as an object is searched for using a face detecting technique, for example. Specifically, while the camera platform is made to rotate the digital still camera in the panning direction, an object (the face of the person) appearing in an image frame is detected.

Then, when an object is detected in the image frame as a result of the object search, determination is made for an optimal composition for the detection state (the number, the position, the size, and the like of the object, for example) of the object in the image frame at that time (optimal composition determination). That is, an optimal angle is obtained for each of panning, tilting, and zooming.

Moreover, if the optimal angle is obtained for each of panning, tilting, and zooming in the optimal composition determination as described above, adjustment is made to obtain such target angles of the panning, tilting, and zooming (composition matching).

The captured image is automatically recorded after the completion of such composition matching.

According to the automatic imaging operation (captured image automatic recording) by such automatic composition matching, it is possible to automatically record a captured image by optimizing a composition without the necessity for any user operation for imaging.

In addition, JP-A-2009-55410 discloses a technique which is for reducing noise in stationary image data obtained by capturing an image by performing block matching while capturing the image and superimposing plural pieces of captured image data having the same contents.

SUMMARY

Incidentally, automatic imaging for which no camera operator is necessary has an advantage in that it is possible to capture an image of a natural facial expression or posture since a user is not conscious of a camera operator, at a party or the like, for example.

Here, when a camera operator manually captures an image in normal imaging, a person as an object is conscious of the camera and tries to act to satisfy preferable conditions for imaging, for example, tries to stand still, tries to keep their eyes open, or the like since the camera operator captures the image after saying something like "I'll take a picture", for example.

However, since the person as an object is not conscious of when an image is captured in the case of automatic imaging, the possibility of capturing unfavorable images as photograph images such as a photograph including blur due to the movement of the object, a photograph of half-closed eyes which is captured at a moment at which the person closes their eyes, a photograph captured at a moment at which the person opens their mouth, and the like is higher than that in the case of manual imaging. These photographs are so-called unsatisfactory photographs.

Accordingly, it is desirable to perform imaging operation control suitable for the situation in which a person as an object is not conscious of capturing images and reduce occurrence of unsatisfactory photographs in an apparatus or a system which performs automatic imaging.

According to the embodiments of the present disclosure, the stationary imaging operation performed in response to the predetermined imaging instruction input by an operator of the imaging apparatus or a person as an object is performed in the first imaging operation setting (the normal imaging setting which will be described later, for example). On the other hand, the imaging operation control is performed in the second imaging operation setting (the unconscious imaging setting which will be described later, for example) in the case of the stationary imaging operation performed independently from the predetermined imaging instruction input by an operator of the imaging apparatus or a person as an object, for example, in the case of the automatic stationary imaging. This second imaging operation setting is a setting that is preferable on the assumption of a state in which a person as an object is not conscious of being imaged.

Therefore, this is, for example, the setting for a shutter speed, exposure control, or captured image processing which is capable of reducing blur of the object. In addition, the stationary image data in which an image of a person as an object is captured in a preferable state is obtained by performing selection processing on captured image data for plural frames as the captured image processing and obtaining the stationary image data as an imaging result. Moreover, the light emission or the sound generation is not performed at or around the release time so as to prevent the imaging operation from disturbing a person as an object, or the like.

According to the embodiments of the present disclosure, it is possible to easily obtain preferable photographs (stationary image data) and thereby to reduce so-called unsatisfactory photographs in the case of a stationary imaging operation which is performed without a predetermined input for an imaging instruction by an operator or a person as an object of the imaging apparatus, for example, in the case of the automatic stationary imaging.

One embodiment described herein is directed to an imaging apparatus including a mode sequence control unit configured to select a control scheme for a still image recording operation in accordance with an imaging operation setting, wherein the mode sequence control unit is configured to select a first control scheme when the imaging operation setting is a normal imaging setting and a second, different control scheme when the imaging operation setting is an unconscious imaging setting. Another embodiment described herein is directed to a method including an act of selecting a control scheme for a still image recording operation in accordance with an imaging operation setting, wherein a first control scheme is selected when the imaging operation setting is a normal imaging setting and a second, different control scheme is selected when the imaging operation setting is an unconscious imaging setting.

A further embodiment described herein is directed to at least one computer-readable medium encoded with instructions that, when executed on at least one processing unit, perform a method including an act of selecting a control scheme for a still image recording operation in accordance with an imaging operation setting, wherein a first control scheme is selected when the imaging operation setting is a normal imaging setting and a second, different control scheme is selected when the imaging operation.

DESCRIPTION OF THE DRAWINGS

FIGS. 11A and 11B are flow charts of processing in an automatic stationary imaging mode according to an embodiment;

FIGS. 12A to 12C are flow charts of processing in a request correspondence imaging mode according to an embodiment;

FIGS. 13A and 13B are explanatory diagrams of setting examples of exposure control schemes according to an embodiment;

DETAILED DESCRIPTION

Figure 1A:
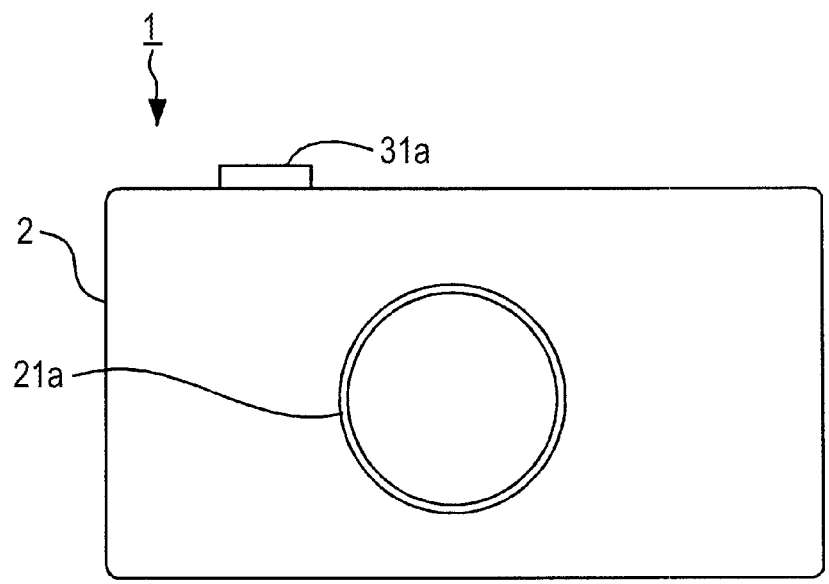
FIGS. 1A and 1B are a front view and a rear view of a digital still camera according to an embodiment of the present disclosure.

Hereinafter, description will be made of embodiments of the present disclosure in the following order. In the embodiments, an imaging apparatus (an imaging system) including a digital still camera and a camera platform will be exemplified.

<1. Configuration of Imaging System>
 [1-1: Overall Configuration]
 [1-2: Digital Still Camera]
 [1-3: Camera Platform]
<2. Functional Configuration Examples>
<3. Imaging Control Processing>
<4. Examples of Normal Imaging Setting and Unconscious Imaging Setting>
<5. Modification Examples of Functional Configuration>
<6. Program>

In addition, terms such as "image frame", "angle of view", "field of view", and "composition" are used in this specification, and the definitions thereof are as follows.

The term "image frame" represents a range of a region corresponding to one screen, in which an image appears such that the image is made to fit the screen, and generally has an outer frame shape which is vertically or horizontally long.

The term "angle of view" is also referred to as a zooming angle and the like and represents by an angle a range within an image frame, which depends on the position of a zoom lens in an optical system of an imaging apparatus. Although the angle of view depends on a focal point distance of an imaging optical system and the size of an image plane (an image sensor, a film), a factor which can be changed in accordance with a focal point distance is referred to as the angle of view in this specification.

The term "field of view" represents a view of an imaging optical system. That is, a field of view is a range of a surrounding scene of an imaging apparatus as an imaging target within an image frame. This depends on a rotation angle in a panning (horizontal) direction and an angle (elevation angle, depression angle) in a tilting (vertical) direction in addition to the above angle of view.

The term "composition" here is also referred to as composition matching and represents an arrangement state of an object within an image frame depending on for example, the field of view including a size setting.

<1. Configuration of Imaging System>
[1-1: Overall Configuration]

An imaging system according to an embodiment includes a digital still camera 1 and a camera platform 10 to which the digital still camera 1 is detachably attached.

The camera platform 10 electrically changes panning/tilting directions of the digital still camera 1. In addition, automatic composition matching and a captured image obtained by the automatic composition matching are automatically recorded.

A person as an object is searched for using a face detecting technique, for example. Specifically, while the camera platform 10 causes the digital still camera 1 to rotate in the panning direction, for example, an object (the face of the person) appearing in an image frame is detected.

Then, when an object is detected in the image frame as a result of the object search, determination is made for an optimal composition for the detection state (the number, the position, the size, and the like of the object, for example) of the object in the image frame at that time (optimal composition determination). That is, an optimal angle is obtained for each of panning, tilting, and zooming.

Moreover, if the optimal angle is obtained for each of panning, tilting, and zooming in the optimal composition determination as described above, adjustment is made to obtain such target angles of the panning, tilting, and zooming (composition matching).

The captured image is automatically recorded after the completion of such composition matching.

According to the automatic imaging operation (captured image automatic recording) by such automatic composition matching, it is possible to automatically record a captured image by optimizing a composition without the necessity for any user operation for capturing an image.

In addition, according to the digital still camera 1 of an embodiment, it is matter of course that the manual imaging is also possible by a user holding the digital still camera 1 by a normal shutter operation (release operation) without attaching the digital still camera 1 to the camera platform 10.

Moreover, the digital still camera 1 can perform automatic imaging in a state in which it is not attached to the camera platform 10. In such a case, although panning and tilting of the camera platform 10 are not performed, automatic imaging is performed while the imaging direction is fixed.

In this case, it is possible to perform automatic imaging while changing the field of view (angle of view) by zoom control.

In addition, it is matter of course that automatic imaging is performed while the imaging direction is fixed without performing panning and tilting even in the state in which the digital still camera 1 is attached to the camera platform 10.

Figure 1B:
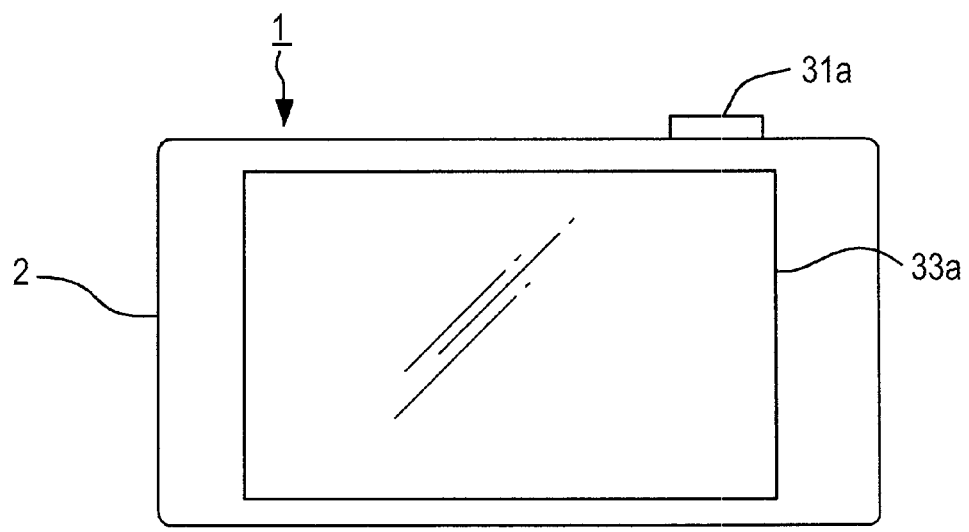

FIGS. 1A and 1B show an appearance example of the digital still camera 1. FIGS. 1A and 1B are a front view and a rear view of the digital still camera 1, respectively.

As shown in FIG. 1A, this digital still camera 1 is provided with a lens unit 21*a* on a front surface side of a main body 2. This lens unit 21*a* is a part which appears outside of the main body 2 as an optical system for imaging.

In addition, a release button 31*a* is provided in an upper surface portion of the main body 2. An image captured by a lens unit 21*a* (captured image) is obtained as captured image data while capturing an image. While capturing an image, captured image data for each frame is obtained at a predetermined frame rate by an image sensor which will be described later.

In addition, when an operation (release operation/shutter operation) with respect to the release button 31*a* is performed, the captured image data (frame image data) at that timing is recorded in a recording medium as stationary image data as a result of imaging. In other words, stationary imaging which is so-called photographing is performed.

As shown in FIG. 1B, the digital still camera 1 includes a display screen unit 33*a* on the rear surface side.

While capturing an image, an image called a "through-the-lens image", which is being captured by the lens unit 21*a* at that time, is displayed on this display screen unit 33*a*. The through-the-lens image is a moving image based on each frame image obtained by the image sensor and an image which expresses the object at that time as it is.

In reproducing an image, image data recorded in a recording medium is reproduced and displayed.

Moreover, an operation image as a GUI (Graphical User Interface) is displayed in response to the user operation on the digital still camera 1.

With a configuration in which a touch panel is assembled with the display screen unit 33*a*, a user can perform a necessary operation by touching the display screen unit 33*a* with their finger.

In addition, the digital still camera 1 is provided with various manipulanda such as a key, dial, and the like other than a release button 31*a* in some cases.

For example, an operation key, a dial, and the like for a zooming operation, mode selection, a menu operation, a cursor operation on a menu, a reproduction operation, and the like are provided.

Figure 2A:
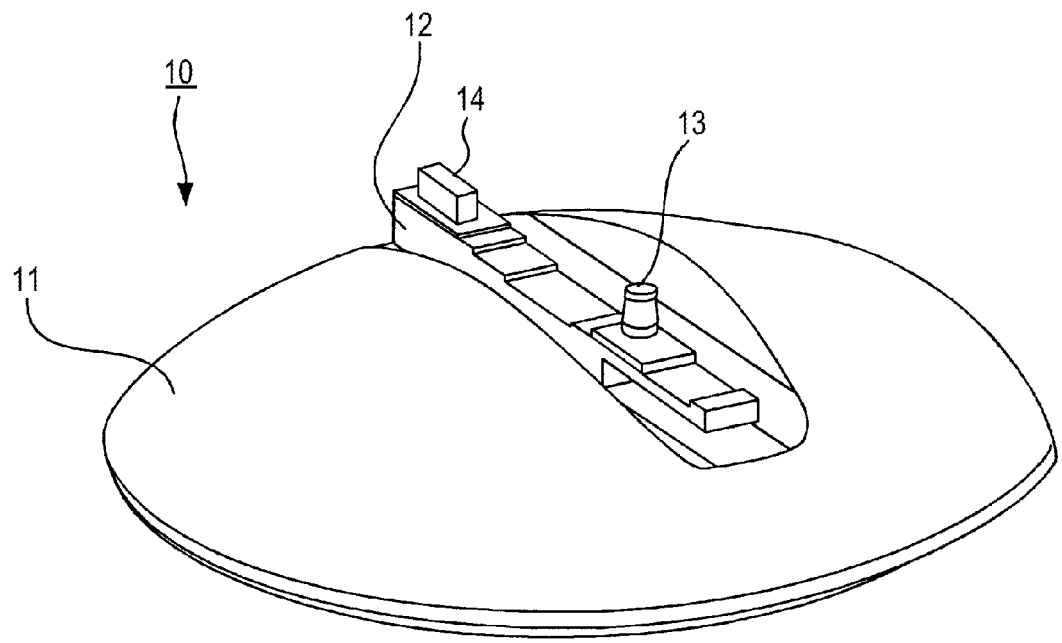
FIGS. 2A and 2B are a perspective view and a rear view of a camera platform to which a digital still camera according to an embodiment can be attached.
Figure 2B:
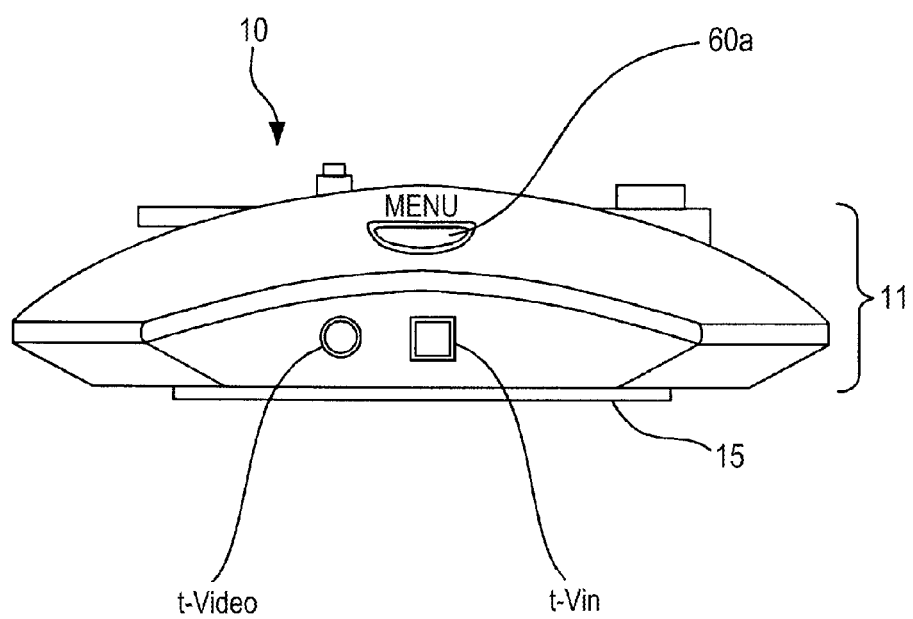

FIG. 2A is a perspective view showing an appearance of the camera platform 10. In addition, FIG. 2B is a rear view of the camera platform 10.

Figure 3:
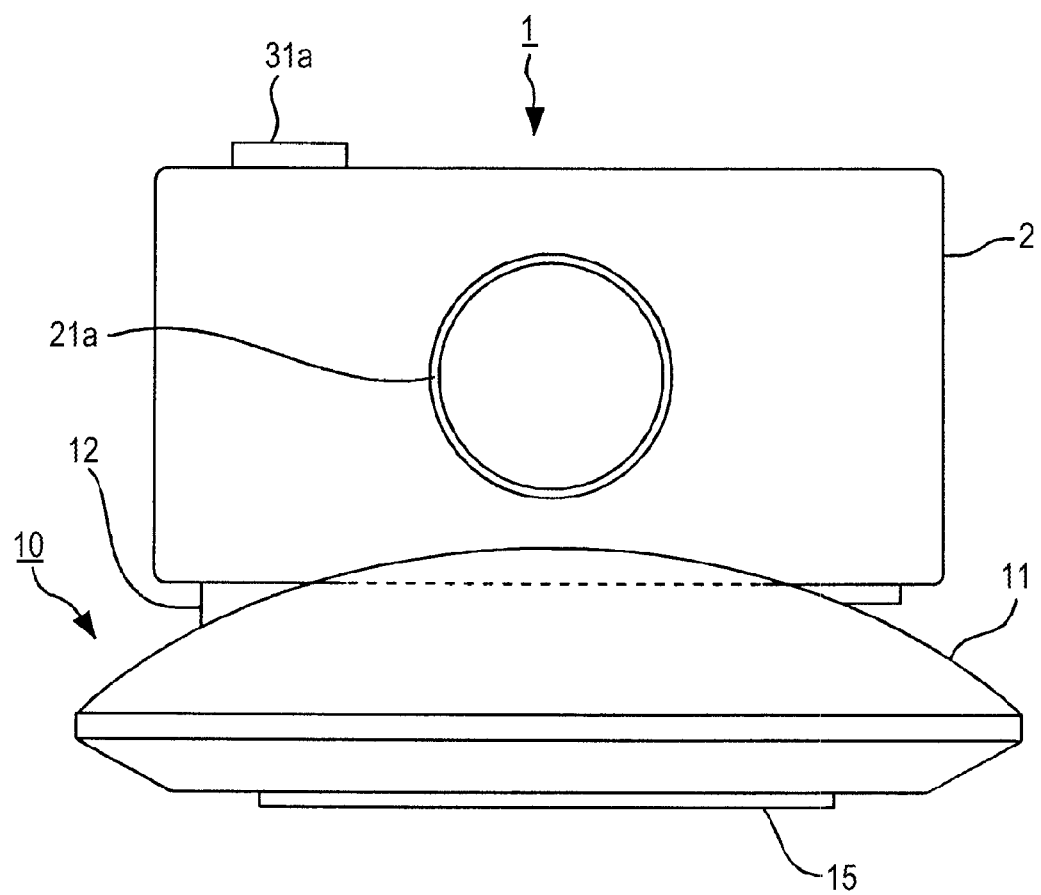
FIG. 3 is a front view of a state in which a digital still camera according to an embodiment is attached to a camera platform.
Figure 4:
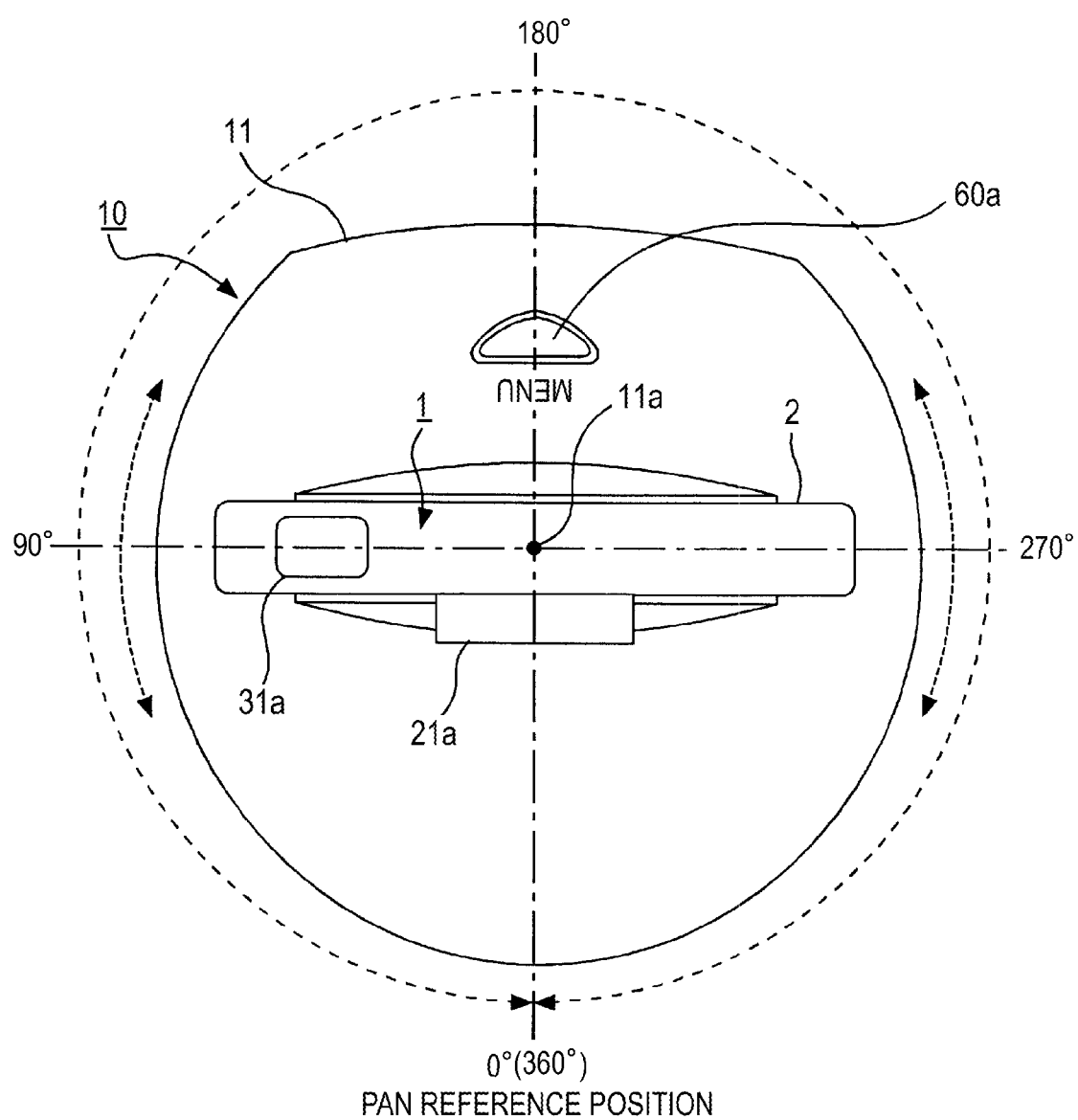
FIG. 4 is an explanatory diagram of movement in a panning direction in a state in which a digital still camera according to an embodiment is attached to a camera platform.
Figure 5A:
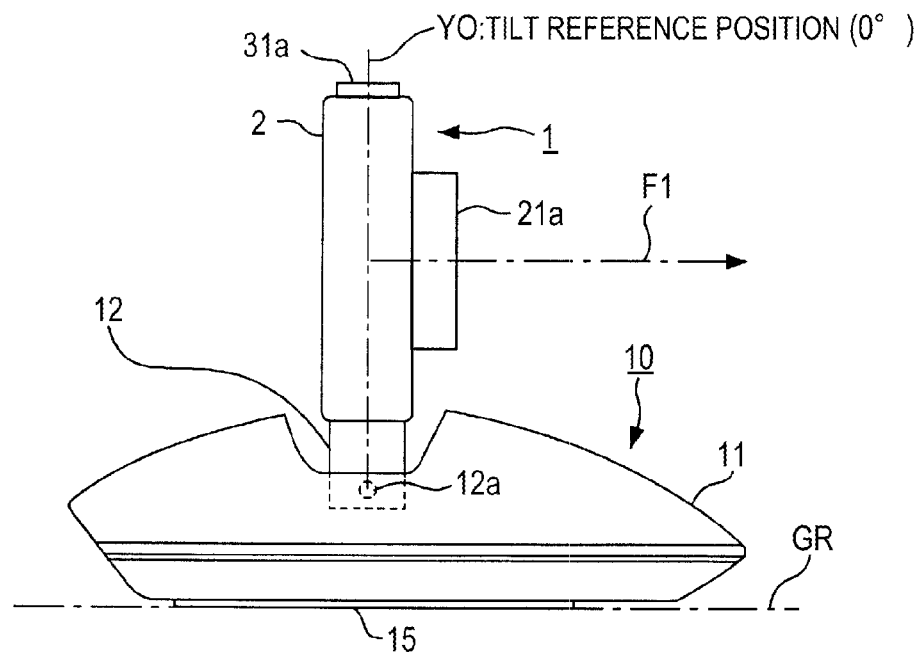
FIGS. 5A and 5B are explanatory diagrams of movement in a tilting direction in which a digital still camera according to an embodiment is attached to a camera platform.
Figure 5B:
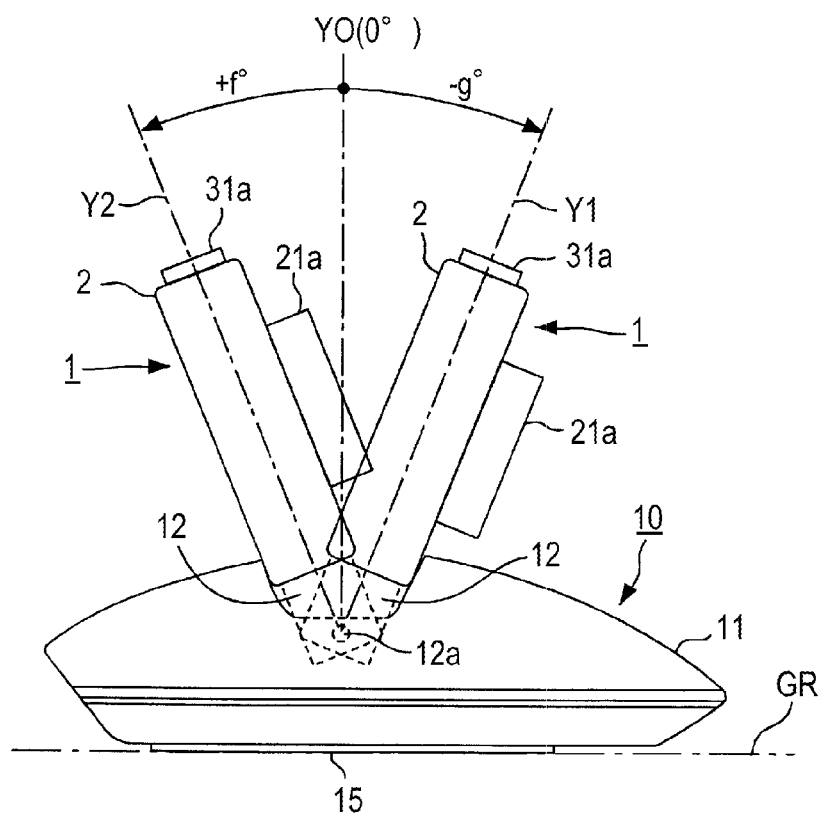

FIGS. 3 to 5B show states in which the digital still camera 1 is appropriately mounted on the camera platform 10. FIG. 3 is a front view, FIG. 4 is a plan view, FIGS. 5A and 5B are side views (particularly, FIG. 5B is a side view showing a movable range of a tilting mechanism).

As shown in FIGS. 2A to 5B, the camera platform 10 roughly has a configuration in which a main body 11 is assembled on a ground table 15 and a camera seating unit 12 is further attached to the main body 11.

When the digital still camera 1 is attached to the camera platform 10, the bottom surface side of the digital still camera 1 is provided on the upper surface side of the camera seating unit 12.

As shown in FIGS. 2A and 2B, a protrusion 13 and a connector 14 are provided on the upper surface portion of the camera seating unit 12. Although not shown in the drawings, a hole which engages with the protrusion 13 is provided in the lower surface portion of the main body 2 of the digital still camera 1. When the digital still camera 1 is appropriately provided on the camera seating unit 12, the hole and the protrusion 13 are in the engaging state. In such a state, the digital still camera 1 is not deviated or detached from the camera platform 10 during general panning and tilting operations of the camera platform 10.

In addition, the digital still camera 1 is provided with a connector at a predetermined position of its lower surface portion. When the digital still camera 1 is appropriately attached to the camera seating unit 12 as described above, the connector of the digital still camera 1 and the connector 14 of the camera platform 10 are connected and come to be in at least a state in which communication therebetween is possible.

The positions of the connector 14 and the protrusion 13 can be changed (moved) within a certain range in the camera seating unit 12 in practice, for example. In addition, it is possible to attach a digital still camera of a different model to the camera seating unit 12 in a state in which the digital still camera can communicate with the camera platform 10 by using an adaptor or the like, for example, with a shape suitable for the shape of the bottom surface portion of the digital still camera 1.

Next, description will be made of basic movements of the digital still camera 1 in the panning/tilting directions by the camera platform 10.

First, the basic movement in the panning direction is as follows.

When the camera platform 10 is provided on a table or a floor, for example, the bottom surface of the ground table 15 is grounded. As shown in FIG. 4, the side of the main body 11 can be rotated in a clockwise direction and in a counter-clockwise direction about a rotation shaft 11*a* as a rotation center in this state. That is, with such an operation, the field of view in the horizontal direction (left and right direction) of the digital still camera 1 attached to the camera platform 10 can be changed (so-called panning).

In addition, a panning mechanism of the camera platform 10 in this case has a configuration in which rotation by equal to or greater than 360° can be freely performed without any limitation both in the clockwise direction and in the counterclockwise direction.

In addition, a reference position in the panning direction is set in the panning mechanism of the camera platform 10.

Here, it is assumed that the rotation position of the main body 11 in the panning direction, that is, the panning position (panning angle) is represented by 0° to 360° while the pan reference position is set to 0° (360°) as shown in FIG. 4.

In addition, the basic movement of the camera platform 10 in the tilting direction is as follows.

As shown in FIGS. 5A and 5B, the movement in the tilting direction can be obtained by changing the angle of the camera seating unit 12 about the rotation shaft 12a as a rotation center toward both directions of the elevation angle and the depression angle.

Here, FIG. 5A shows a state in which the camera seating unit 12 is at a tilting reference position Y0 (0°). In this state, an imaging direction F1 which coincides with an imaging optical axis of the lens unit 21a (optical system unit) is parallel to the ground surface portion GR on which the ground table 15 is grounded.

First, the camera seating unit 12 can be moved within a range of a predetermined maximum rotation angle +f° from the tilting reference position Y0 (0°) about the rotation shaft 12a as a rotation center in the elevation angle direction as shown in FIG. 5B. In addition, the camera seating unit 12 can be moved within a range of a predetermined maximum rotation angle −g° from the tilting reference position Y0 (0°) about the rotation shaft 12a as a rotation center in the depression angle direction.

It is possible to change the field of view in the tilting direction (vertical direction) of the digital still camera 1 attached to the camera platform 10 (camera seating unit 12) by moving the camera seating unit 12 within the range from the maximum rotation angle +f° to the maximum rotation angle −g° while using the tilting reference position Y0 (0°) as a base point. That is, it is possible to obtain a tilting operation.

As shown in FIG. 2B, the camera platform 10 is formed with a power terminal unit t-Vin to which a power cable is detachably connected and a video terminal unit t-Video to which a video cable is detachably connected on the rear surface portion of the main body 11 thereof.

The camera platform 10 is configured to charge the digital still camera 1 by supplying power, which has been input through the power terminal unit t-Vin, to the digital still camera 1 attached to the camera seating unit 12 described above.

That is, the camera platform 10 of this example also functions as a cradle (dock) which charges the digital still camera 1.

In addition, the camera platform 10 in this example is configured to externally output a video signal through the video terminal unit t-Video when the video signal based on a captured image, for example, is transmitted from the side of the digital still camera 1.

As shown in FIGS. 2B and 4, a menu button 60a is provided on the rear surface portion of the main body 11 of the camera platform 10. The display screen unit 33a on the side of the digital still camera 1 performs menu display, for example, by an operation of the menu button for the communication between the camera platform 10 and the digital still camera 1. With such menu display, it is possible for a user to perform necessary operations.

Incidentally, in this embodiment, user touch operation is employed as one of the triggers with which the operation mode is changed to the request correspondence imaging mode during the automatic stationary imaging mode which will be described later.

Figure 6A:
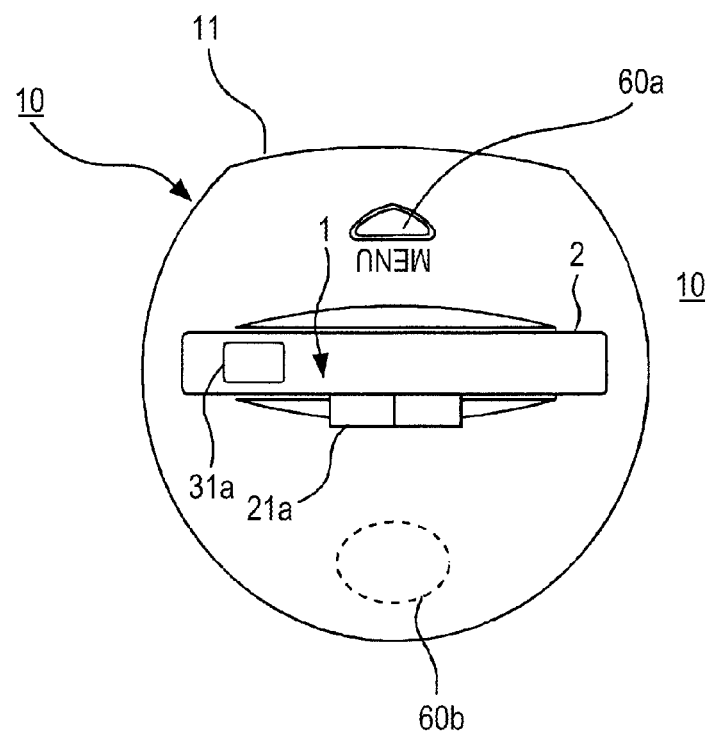
FIGS. 6A and 6B are explanatory diagrams of touch operation positions of a camera platform according to an embodiment.

Specifically, a user performs an operation of touching the camera platform 10. For this reason, a touch region 60b is formed on the upper surface of the main body 11 as shown in FIG. 6A. When a user touches the touch region 60b, a touch sensor installed in the camera platform 10 detects this touching operation.

Figure 6B:
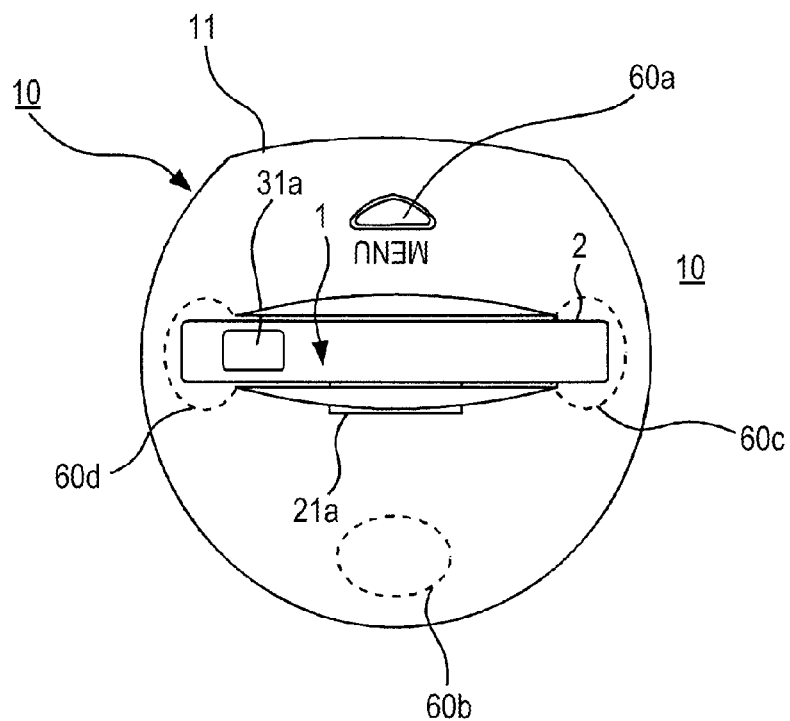

In addition, although the description was made of FIGS. 6A and 6B in which the touch region 60b corresponds to a part of a region on the front surface side represented by a broken line, it is also applicable that the touch region 60b is formed on the entire upper surface of the main body 11, for example.

FIG. 6B shows an example in which touch regions 60b, 60c, and 60d are respectively formed on the side of the front direction, the side of the right direction, and the side of the left direction on the upper surface of the main body 11 of the camera platform 10. For example, three touch sensors are installed in the camera platform 10, and the touch operation on each touch region 60b, 60c, or 60d is detected by each touch sensor.

In this case, it is possible to determine a direction in which a user has performed the touch operation from among the front, right, and left directions on the side of the imaging system including the digital still camera 1 and the camera platform 10 based on which touch sensor has detected the touch operation.

Although a case in which three touch regions 60b to 60d are formed is exemplified here, it is matter of course that more touch sensors may be provided to determine more precisely the direction in which the touch operation has been made in more touch regions.

Although not shown in the drawings, the camera platform 10 is provided with a sound input unit (a sound input unit 62 which will be described later) including a microphone and a sound input circuit system in some cases.

In addition, the camera platform 10 is provided with an imaging unit (an imaging unit 63 which will be described later) including an imaging lens, an image sensor, an imaging signal processing system, and the like in some cases.

Furthermore, the camera platform 10 is provided with a light-emitting display unit such as an LED, a display unit using a liquid crystal panel and the like, a sound output unit including a speaker, a sound output circuit, and the like as a release announcement execution unit 64, which will be described later, in some cases.

[1-2: Digital Still Camera]

Figure 7:
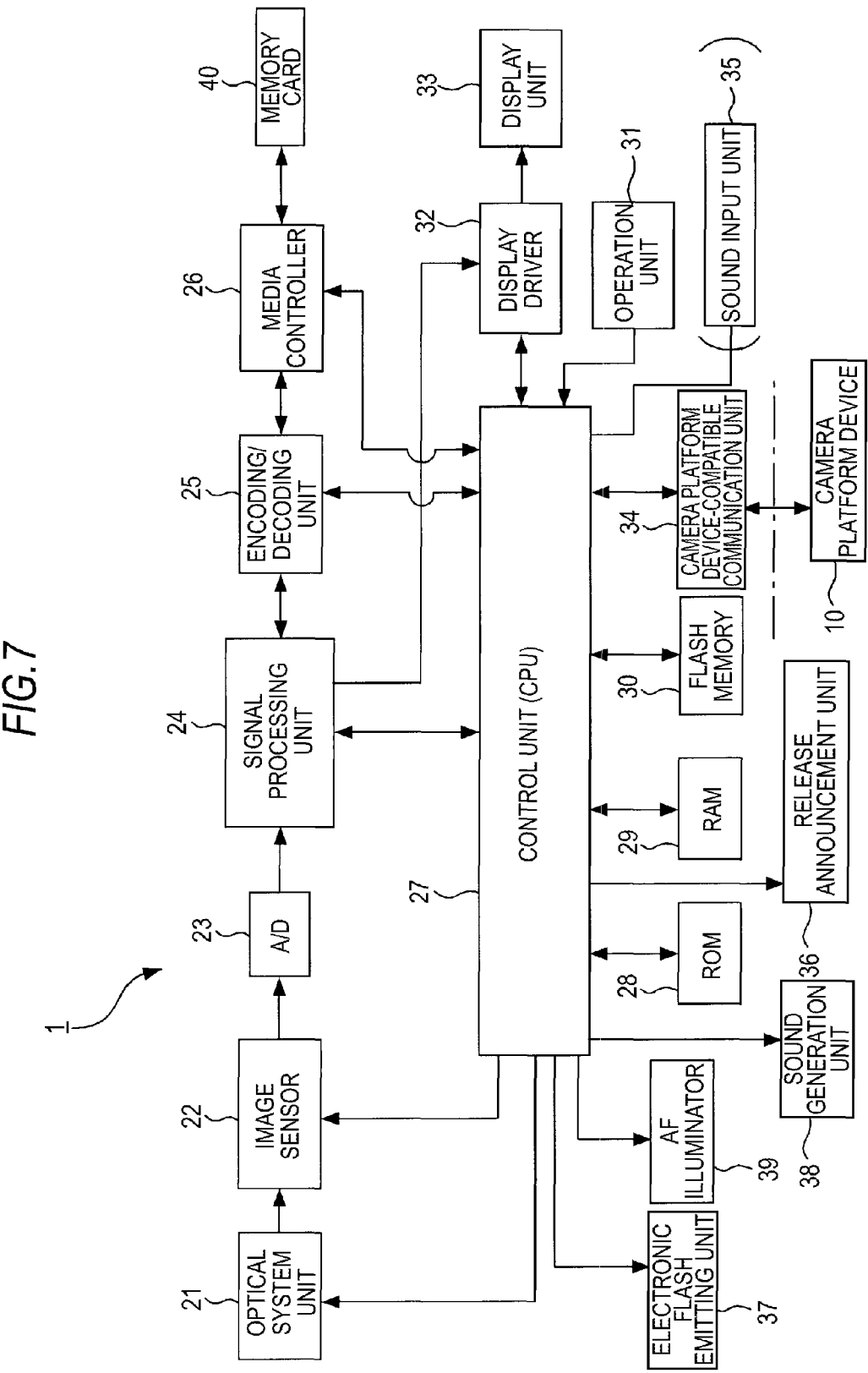
FIG. 7 is a block diagram illustrating an inner configuration of a digital still camera according to an embodiment.

FIG. 7 is a block diagram illustrating an inner configuration example of the digital still camera 1.

An optical system unit 21 has a predetermined number of lens groups for capturing image including a zoom lens, a focus lens, and the like and a diaphragm and forms an image on a light receiving surface of an image sensor 22 using incident light as imaging light.

In addition, the optical system unit 21 is also provided with a drive mechanism unit which drives the zoom lens, the focus lens, the diaphragm, and the like. The operations of the drive mechanism unit is controlled by so-called camera control performed by the control unit 27, for example, including zoom (angle of view) control, automatic focal point adjustment control, automatic exposure control, and the like.

The image sensor 22 performs so-called photoelectric conversion by which the imaging light obtained at the optical system unit 21 is converted into an electric signal. For this reason, the image sensor 22 receives the imaging light from the optical system unit 21 at the light receiving surface of the photoelectric conversion element and sequentially outputs signal charge accumulated in accordance with the intensity of the received light at predetermined timing.

With such a configuration, the electric signal (imaging signal) corresponding to the imaging light is output.

In addition, although the photoelectric conversion element (imaging element) employed as the image sensor 22 is not particularly limited, it is possible to exemplify a CMOS (Complementary Metal Oxide Semiconductor) sensor, a CCD (Charge Coupled Device), and the like, for example, in the present situation. In addition, a configuration including an analog-to-digital converter corresponding to an A/D converter 23, which will be described next, as a device (component) which corresponds to the image sensor 22 when the CMOS sensor is employed.

The imaging signal output from the image sensor 22 is input to the A/D converter 23 thereby to be converted into a digital signal and then input to a signal processing unit 24.

The signal processing unit 24 includes a DSP (Digital Signal Processor), for example, and performs predetermined signal processing based on a program with respect to the digital imaging signal output from the A/D converter 23.

The signal processing unit 24 receives the digital imaging signal output from the A/D converter 23 in a unit corresponding to one stationary image (frame image). Then, the signal processing unit 24 performs predetermined signal processing on the captured image data in a unit of a received stationary image thereby to generate stationary image data corresponding to one stationary image.

In addition, the signal processing unit 24 performs object detection processing or image analyzing processing for composition processing using the thus obtained captured image data.

Here, when the captured image data generated by the signal processing unit 24 as described above is recorded as stationary image data in a memory card 40 as a recording medium, the captured image data corresponding to one stationary image is output from the signal processing unit 24 to an encoding/decoding unit 25, for example.

The encoding/decoding unit 25 performs compression coding based on a predetermined stationary image compression coding scheme on the captured image data in a unit of a stationary image output from the signal processing unit 24, adds a header thereto in response to the control by the control unit 27, and converts the image data, which has been compressed to a predetermined format, into a image data format. Then, the thus generated stationary image data is transferred to the media controller 26.

The media controller 26 is controlled by the control unit 27 to write the transferred stationary image data in the memory card 40 and causes the memory card 40 to record the stationary image data. The memory card 40 in this case is a recording medium which has a card-like outer shape on the basis of a predetermined standard and is configured to have a nonvolatile semiconductor storing device such as a flash memory therein.

It is also applicable to use a recording medium of another type with a different shape, which records the stationary image data, other than the memory card. For example, it is also possible to employ various kinds of recording media such as an optical disc, a hard disk, a semiconductor memory chip attached so as not to be detached such as a flash memory chip, hologram memory, and the like.

In addition, the digital still camera 1 can display a so-called through-the-lens image, which is an image being currently captured, by causing the display unit 33 to display the image with the use of the captured image data obtained by the signal processing unit 24.

For example, the signal processing unit 24 receives the captured image signal output from the A/D converter 23 as described above to generate the captured image data corresponding to one stationary image. By continuously performing this operation, the captured image data corresponding to a frame image in a moving image is sequentially generated. Then, the captured image data which has been sequentially generated as described above is transferred to the display driver 32 in response to the control by the control unit 27.

The display driver 32 generates a drive signal for driving the display unit 33 based on the captured image data input from the signal processing unit 24 as described above and outputs the generated drive signal to the display unit 33. With such an operation, images based on the captured image data in units of stationary images are sequentially displayed on the display unit 33.

A user can view these images in the display unit 33 as a moving image which is being currently captured. That is, a through-the-lens image is displayed.

In addition, the digital still camera 1 can reproduce the stationary image data recorded in the memory card 40 and cause the display unit 33 to display the image.

In order to do so, the control unit 27 designates stationary image data and instructs the media controller 26 to read the data from the memory card 40. The media controller 26 accesses an address on the memory card 40 in which the designated stationary image data is recorded to execute the data reading in response to the instruction and transfers the read data to the encoding/decoding unit 25.

The encoding/decoding unit 25 is controlled by the control unit 27, for example, to extract entity data as a compressed stationary image data from the stationary image data transferred from the media controller 26, executes decoding processing with respect to the compression coding of the compressed stationary image data, and obtains image data corresponding to one stationary image. Then, the image data is transferred to the display driver 32. With such operations, the image of the stationary image data recorded in the memory card 40 is reproduced and displayed in the display unit 33.

In addition, it is also possible to cause the display unit 33 to display the user interface image (operation image) along with the reproduced image of the through-the-lens image or the stationary image data described above.

In such a case, the control unit 27 generates display image data as a necessary user interface image in accordance with the operation state at that time, for example, and outputs the display image data to the display driver 32. With such operations, the user interface image is displayed on the display unit 33.

Moreover, this user interface image can be displayed on the display screen of the display unit 33 separately from the reproduced image of the monitor image or the captured image data as a specific menu screen, for example, or displayed so as to be superimposed or synthesized at a part of the reproduced image of the monitor image or the captured image data.

The control unit 27 includes a CPU (Central Processing Unit) and constitutes a microcomputer along with a ROM 28, a RAM 29, and the like.

The ROM 28 stores various kinds of setting information relating to the operations of the digital still camera 1 in addition to the program to be executed by the CPU as the control unit 27, for example.

The RAM 29 is a main memory for the CPU.

The flash memory 30 in this case is provided as a nonvolatile storing region used for storing various kinds of setting information which is necessary to be changed (rewritten) in accordance with a user operation, an operation history, or the like, for example.

If a nonvolatile memory such as a flash memory, for example, is employed as the ROM 28, it is also applicable to use a part of the storing region in the ROM 28 instead of the flash memory 30.

According to this embodiment, the control unit 27 performs various kinds of control for user manual stationary imaging, imaging in the automatic stationary imaging mode, imaging in the request correspondence imaging mode, which will be described later, and the like, during the automatic stationary imaging.

Various kinds of preparation processing for imaging are performed for imaging in the automatic stationary imaging mode or in the request correspondence imaging mode.

First, as object detection processing, object detection from each frame image obtained by the signal processing unit 24 is performed (or the signal processing unit 24 is made to perform the object detection) while the field of view is changed, and processing for searching an object around the digital still camera 1 is performed.

As composition processing, optimal composition determination in which an optimal composition in accordance with the object state detected in the object detection is determined based on a predetermined algorithm, composition matching to obtain the optimal composition obtained in the optimal composition determination as a target composition are performed.

After such preparation processing for imaging, the control unit 27 performs control and processing to automatically record the captured image.

In addition, control for an announcement operation by which user is notified of performing the stationary imaging is performed before the execution of the imaging (release) in some cases.

Such control processing will be described later.

The operation unit 31 integrally shows various kinds of manipulanda provided in the digital still camera 1 and an operation information signal output part which generates an operation information signal in accordance with the operation performed on these manipulanda and outputs the operation information signal to the control unit 27.

Various kinds of manipulanda include a release button 31a, and a power button, a mode button, a zoom operation button, an operation dial, and the like, which are not shown in FIG. 1.

If the display unit 33 is formed as a touch panel, the touch sensor portion is also one of the specific examples of the operation unit 31.

Moreover, a receiving unit for a command signal from a remote controller is also one of the examples of the operation unit 31.

The control unit 27 executes predetermined processing in response to the operation information signal input from the operation unit 31. With such an operation, the operations of the digital still camera 1 in response to the user operation are executed.

Although the description was made in which the touch sensor was provided in the camera platform 10, a case can also be considered in which a touch sensor is provided in a case body of the digital still camera 1 as an example. The touch sensor in such a case is also one of the specific examples of the operation unit 31 shown in the drawing.

A camera platform-compatible communication unit 34 is a part performing communication between the camera platform 10 side and the digital still camera 1 side based on a predetermined communication scheme.

For example, the camera platform-compatible communication unit 34 includes a physical layer configuration making it possible to communicate a communication signal with the communication unit of the camera platform 10 side when the digital still camera 1 is attached to the camera platform 10 and a configuration for implementing the communication processing corresponding to a predetermined layer which is positioned in a higher order. The physical layer configuration includes a connector part connected to the connector 14 shown in FIGS. 2A and 2B.

In order to make it possible to charge the digital still camera 1 from the side of the camera platform 10, not only the terminal which communicates the communication signal but also a terminal which transmits the power for charging is provided in the above respective connectors. Although not shown in the drawing, a battery attachment unit to which a battery is detachably attached is provided in the digital still camera 1 such that the battery attached to the attachment unit is charged by the power transmitted from the camera platform 10 side.

In addition, the digital still camera 1 is provided with a sound input unit 35 in some cases. The sound input unit 35 is used to detect the input of voice speaking a specific word and the input of specific sound (for example, a clapping sound or the like) as a trigger input for the request correspondence imaging mode which will be described later.

The sound input unit 35 has a sound signal processing circuit including a microphone and a microphone amplifier, a sound analyzing unit which determines specific sound, and the like. In addition, it is also applicable that the sound analysis is performed by the control unit 27.

When the input of the voice of a specific word or the input of the specific sound is determined as the determination for release timing, the sound input unit 35 is provided.

The digital still camera 1 is provided with a release announcement execution unit 36 in some cases. The release announcement execution unit 36 is a part which executes the release announcement operation which will be described later.

The release announcement execution unit 36 is applicable as long as it is a device unit which can notify the user of performing the stationary imaging with a display, sound, or the like.

For example, a case can be considered in which the release announcement execution unit 36 is configured as a light emitting operation unit including a light emitting element such as an LED and a light emitting drive circuit in order to perform announcement with a predetermined light emitting pattern.

Alternatively, the release announcement execution unit 36 may be a liquid crystal display unit or the like provided on the front side of the case body of the digital still camera 1 as a display unit which performs announcement with specific character display, color display, pattern display, or the like.

Alternatively, the release announcement execution unit 36 may be configured as a sound output unit which includes a sound signal generation unit, an amplifier, a speaker, and the like to perform announcements with an electronic sound, beep sound, message sound, or the like.

Moreover, they may be employed together.

In addition, the digital still camera 1 is provided with an strobe light emitting unit 37. The strobe light is emitted at the time of release in response to the instruction by the control unit 27 based on a user setting for the strobe light emission or determination of external light state.

In addition, the digital still camera 1 is provided with an AF illuminator light emitting unit 39. The AF illuminator light emitting unit 39 irradiates the object with red light or the like in order to satisfactorily perform automatic focusing control even in a dark place. For example, the AF illuminator light emitting unit 39 is controlled by the control unit 27 to perform light emission operation at the time of executing the automatic focusing before release, for example.

In addition, the digital still camera 1 is provided with a sound generation unit 38. The sound generation unit 38 generates electronic sound as so-called shutter sound at the time of release. In addition, the sound generation unit 38 generates a guide voice in the case of self timer imaging, various alarm voice, and the like. The sound generation unit 38 generates shutter sound and the like at timing in response to the instruction by the control unit 27.

[1-3: Camera Platform]

Figure 8:
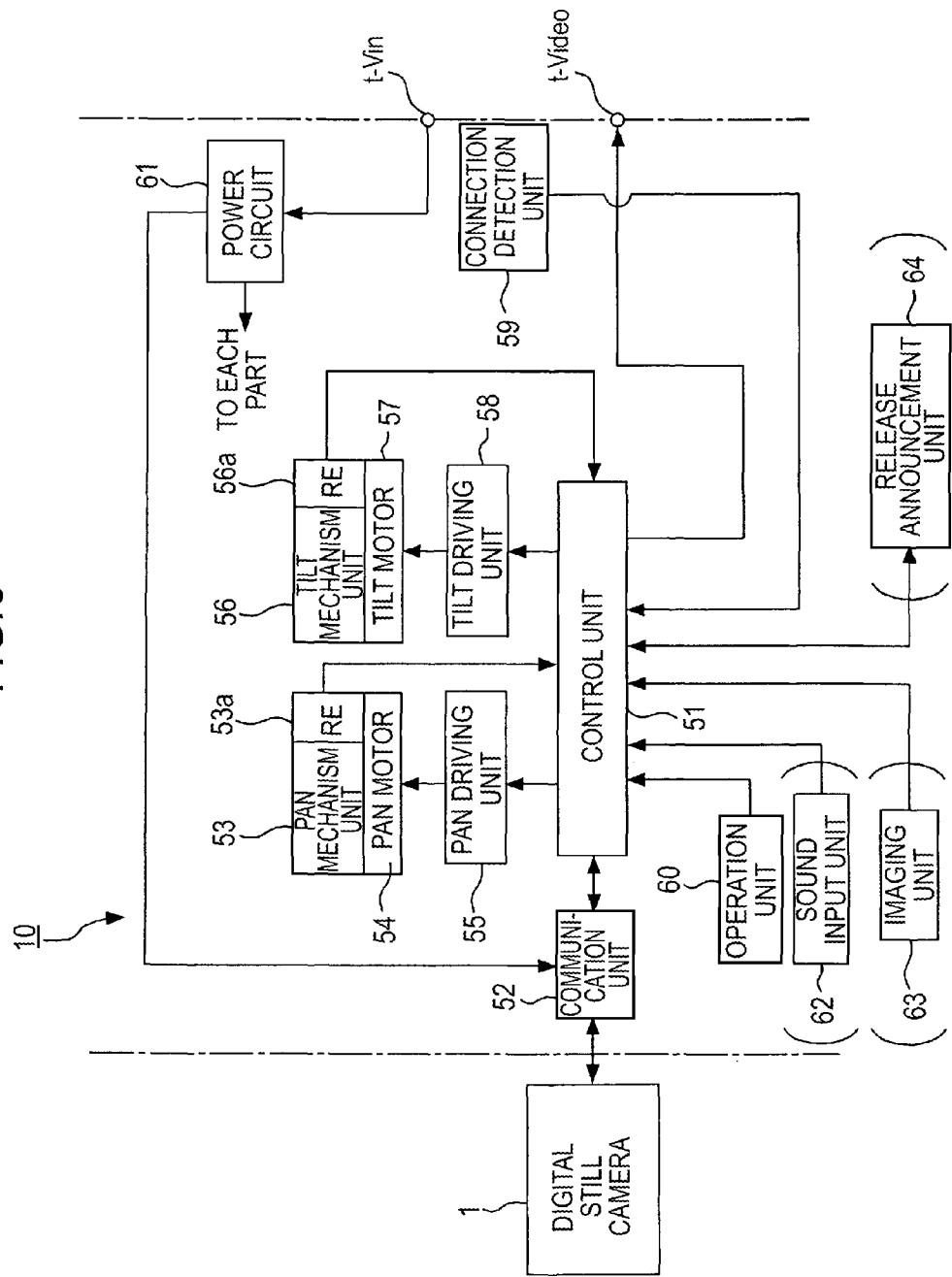
FIG. 8 is a block diagram illustrating an inner configuration of a camera platform according to an embodiment.

FIG. 8 shows an inner configuration example of the camera platform 10.

As shown in FIG. 2B, the camera platform 10 is provided with the power terminal unit t-Vin and the video terminal unit t-Video.

As shown in FIG. 8, power input through the power terminal unit t-Vin passes through a power circuit 61 and is then supplied as operation power for each necessary part in the camera platform 10. In addition, the power circuit 61 generates power for charging the digital still camera 1, and the power for charging is supplied to the digital still camera 1 side through the communication unit 52 (connector).

In addition, the video signal transmitted from the digital still camera 1 side is supplied to the video terminal unit t-Video through the components from the communication unit 52 to the control unit 51.

In addition, description was made as if the operation power for each part of the camera platform 10 is supplied only through the power input terminal t-Vin, however in practice the camera platform 10 is provided with an attachment unit for a battery, and the camera platform 10 is configured to be able to supply the operation power for each part from the battery attached to the attachment unit.

In addition, the camera platform 10 of this embodiment is provided with a connection detection unit 59 which detects the presence of the connection of the cable to the power terminal unit t-Vin and the video terminal unit t-Video. As a specific configuration of the mechanism which detects the presence of the connection of the cable connection, it is possible to exemplify a configuration in which a switch is turned on and off in accordance with the connection and disconnection of the cable. In this embodiment, however, the connection detection unit 59 is applicable as long as it is configured to output a detection signal for specifying the connection and the disconnection of the cable, and the specific configuration thereof is not particularly limited.

The detection signal of the connection detection unit 59 (a detection signal for the power terminal unit t-Vin and a detection signal for the video terminal unit t-Video) is supplied to the control unit 51.

In addition, the camera platform 10 is provided with the pan and tilting mechanisms as described above, and the parts corresponding thereto is shown in FIG. 8 as a panning mechanism unit 53, a paning motor 54, a tilting mechanism unit 56, and a tilting motor 57.

The panning mechanism unit 53 includes a mechanism which provides movement in the pan (horizontal, left and light) direction shown in FIG. 4 to the digital still camera 1 attached to the camera platform 10, and the movement of this mechanism is obtained by rotating the panning motor 54 in the normal and reverse directions.

Similarly, the tilting mechanism unit 56 includes a mechanism which provides movement in the tilting (vertical, upper and lower) direction shown in FIGS. 5A and 5B to the digital still camera 1 attached to the camera platform 10, and the movement of this mechanism is obtained by rotating the tilting motor 57 in the normal and reverse directions.

The control unit 51 includes a micro computer formed with a combination including a CPU, a ROM, a RAM, and the like and controls the movement of the panning mechanism unit 53 and the tilting mechanism unit 56.

For example, when the control unit 51 controls the movement of the panning mechanism unit 53, a signal for instructing the direction in which the panning mechanism is to be moved and the movement speed is output to a pan driving unit 55. The pan driving unit 55 generates a motor driving signal corresponding to the input signal and outputs the motor driving signal to the panning motor 54. This motor driving signal is a pulse signal corresponding to PWM control when the motor is a stepping motor, for example.

The panning motor 54 is rotated in a necessary rotation direction at a necessary rotation speed, for example, by the motor driving signal, and as a result, the panning mechanism unit 53 is also driven to move in a corresponding movement direction at a corresponding movement speed.

Similarly, when the movement of the tilting mechanism unit 56 is controlled, the control unit 51 outputs a signal for instructing a necessary movement direction and a necessary movement speed for the tilting mechanism unit 56 to the tilt driving unit 58. The tilt driving unit 58 generates a motor driving signal corresponding to the input signal and outputs the motor driving signal to the tilting motor 57. The tilting motor 57 is rotated in a necessary rotation direction at a necessary rotation speed, for example, by the motor driving signal, and as a result, the tilting mechanism unit 56 is also driven to move in a corresponding movement direction at a corresponding movement speed.

Here, the panning mechanism unit 53 is provided with a rotary encoder (rotation detector) 53a. The rotary encoder 53a outputs a detection signal representing the rotation angle amount to the control unit 51 in accordance with the rotation movement of the panning mechanism unit 53. Similarly, the tilting mechanism unit 56 is provided with a rotary encoder 56a. This rotary encoder 56a also outputs a signal representing the rotation angle amount to the control unit 51 in accordance with the rotation movement of the tilting mechanism unit 56.

With such operations, the control unit 51 can obtain (monitor) the information regarding the rotation angle amounts of the panning mechanism unit 53 and the tilting mechanism unit 56 being currently driven in real time.

The communication unit 52 is a part which executes communication with the camera platform-compatible communication unit 34 in the digital still camera 1 attached to the camera platform 10 based on a predetermined communication scheme.

The communication unit 52 includes a physical layer configuration making it possible to communicate a communication signal with another communication unit side in a wired or wireless manner and a configuration for implementing the communication processing corresponding to a predetermined layer which is positioned in a higher order, in the same manner as in the camera platform-compatible communication unit 34. The physical layer configuration includes the connector 14 of the camera seating unit 12 shown in FIGS. 2A and 2B.

Specifically, the operation unit 60 integrally shows manipulanda as a menu button 60a shown in FIGS. 2B and 4 and an operation information signal output part which generates an operation information signal in accordance with the operation performed on these manipulanda and outputs the operation information signal to the control unit 51. The control unit 51 executes predetermined processing in response to the operation information signal input from the operation unit 60.

The description was made of FIGS. 6A and 6B in which the camera platform 10 was provided with a touch sensor in some cases. The touch sensor is one of the examples of the operation unit 60. In such a case, the detection signal of the touch operation through the touch sensor is supplied to the control unit 51.

Moreover, when a remote controller is prepared for the camera platform 10, the receiving unit for the command signal from the remote controller is also one of the examples of the operation unit 60.

In addition, the camera platform 10 is provided with a sound input unit 62 in some cases. The sound input unit 62 is provided to detect the input of a voice speaking a specific word or input of a specific sound (for example, a clapping sound) as a trigger input to the request correspondence imaging mode which will be described later.

The sound input unit 62 has a sound signal processing circuit including a microphone and a microphone amplifier, a sound analyzing unit which determines specific sound, and the like. In addition, it is also applicable that the sound analysis is performed by the control unit 51.

Moreover, a sound input unit 62 is provided on the camera platform 10 side in some cases in order to handle the case in which the input of voice speaking a specific word or input of specific sound is determined as a determination for the release timing at the digital still camera 1.

In addition, the camera platform 10 is provided with an imaging unit 63 in some cases. The imaging unit 63 is provided to detect a specific object state such as a specific posture or a specific direction of eyes of a user on the object side as a trigger input to the request correspondence imaging mode.

The imaging unit 63 includes an optical system unit, an image sensor, an A/D converter, a signal processing unit, an image analyzing unit, and the like. In addition, it is also applicable that the image analysis is performed by the control unit 51.

Moreover, the imaging unit 63 is provided on the camera platform 10 side when a specific object state is determined as determination for the release timing at the digital still camera 1.

In addition, the camera platform 10 is provided with a release announcement execution unit 64 in some cases. The release announcement execution unit 64 is a part which executes the release announcement operation which will be described later.

The release announcement execution unit 36 is applicable as long as it is a device unit which can notify the user of performing the stationary imaging with display, sound, or the like.

For example, a case can be considered in which the release announcement execution unit 64 is configured as a light emitting operation unit including a light emitting element (for example, an LED) and a light emitting drive circuit in order to perform announcement with a predetermined light emitting pattern or a predetermined light emitting frequency, for example.

Alternatively, the release announcement execution unit 64 may be a liquid crystal display unit or the like provided on the front side of the case body of the digital still camera 1 as a display unit which performs announcement with specific character display, color display, pattern display, or the like.

Alternatively, the release announcement execution unit 64 may be configured as a sound output unit which includes a sound signal generation unit, an amplifier, a speaker, and the like to perform announcement with electronic sound, beep sound, message voice sound, or the like.

Moreover, they may be employed together.

In addition, it can also be considered that a predetermined operation including the combination of panning and tilting is performed as a release announcement operation. In such a case, the panning mechanism unit 53 and the tilting mechanism unit 56 perform actual operation as the release announcement execution unit 64.

<2. Functional Configuration Examples>

Next, description will be made of a functional configuration example executed by hardware or software (a program) for the digital still camera 1 and the camera platform 10 constituting the imaging system of this embodiment with reference to the block diagram of FIG. 9.

This functional configuration example is configured to implement the imaging control apparatus which performs the imaging operation control on the imaging system of this example and mainly has a control processing function formed in association between a hardware configuration including the control unit 27 of the digital still camera 1 and the control unit 51 of the camera platform 10 and a software module which is activated by them. FIG. 9 shows necessary control functions for processing in the automatic imaging mode and in the request correspondence imaging mode as blocks for each function.

Figure 9:
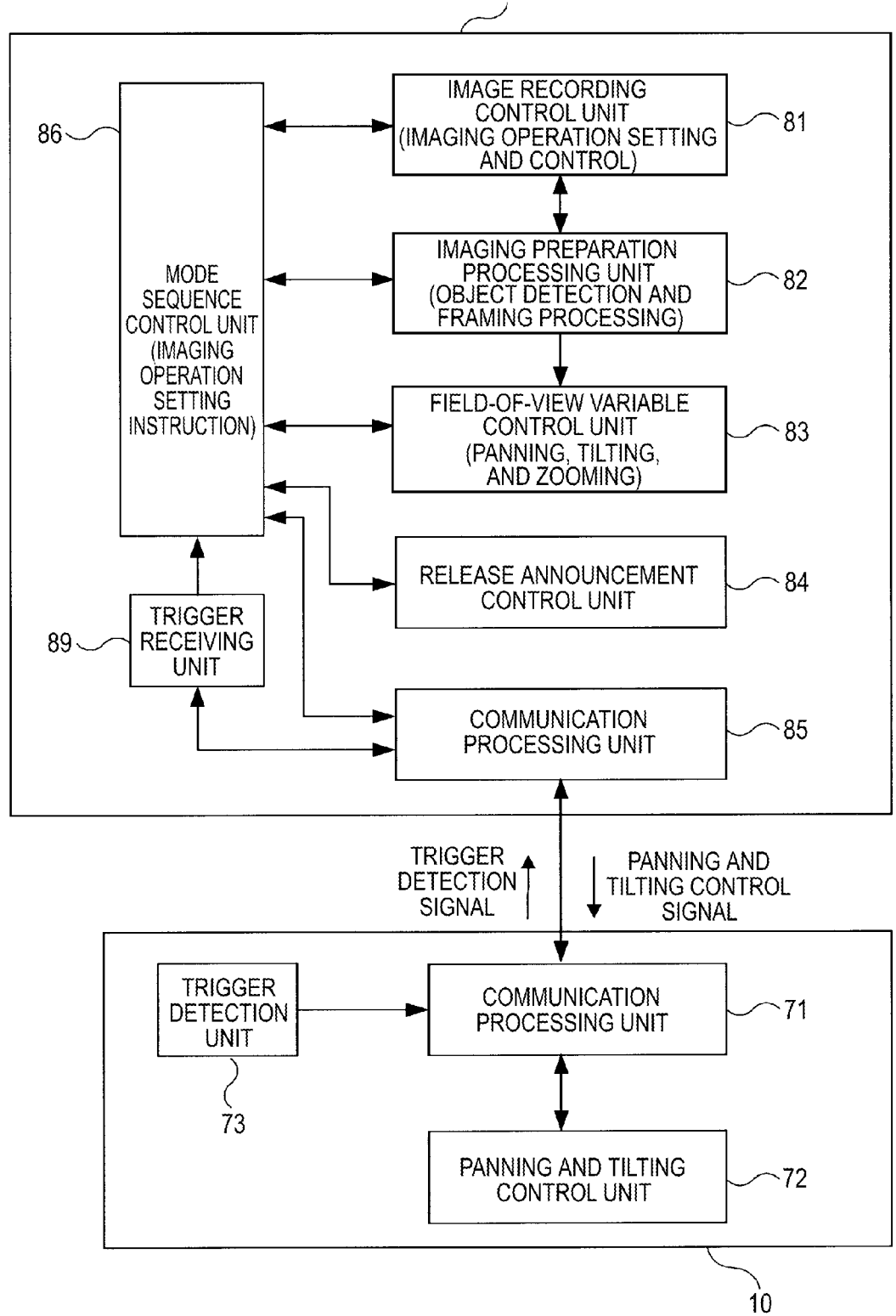
FIG. 9 is an explanatory diagram of a configuration example of control functions according to an embodiment.

In addition, although the functional configuration example can be considered in various manners, one example is shown in FIG. 9, and the other examples will be described later.

As shown in FIG. 9, an image recording control unit 81, an imaging preparation processing unit 82, a field-of-view variable control unit 83, a release announcement control unit 84, a communication processing unit 85, a mode sequence control unit 86, and a trigger receiving unit 89 are provided on the digital still camera 1 (control unit 27) side.

In addition, a communication processing unit 71, a panning and tilting control unit 72, and a trigger detection unit 73 are provided on the camera platform 10 (control unit 51) side.

First, the image recording control unit 81 on the digital still camera 1 side is a part for obtaining the image obtained by imaging as image signal data (captured image data) and executing control processing for storing this captured image data as stationary image data in a recording medium. In addition, the image recording control unit 81 performs control for reproduction of the recorded stationary image data, a display operation, a display operation for a through-the-lens image during imaging, or the like.

That is, the image recording control unit 81 controls the optical system unit 21, the image sensor 22, the A/D converter 23, the signal processing unit 24, the encoding/decoding unit 25, the media controller 26, the display driver 32, and the like shown in FIG. 8. That is, the image recording control unit 81 is a functional part which controls the basic operations of the digital still camera 1 including the instruction of the lens driving control of the optical system unit 21, the imaging operation of the image sensor 22, the imaging signal processing, the recording and reproduction processing, and the like and the execution of the stationary imaging.

In the case of this example, the image recording control unit 81 performs control based on the imaging operation setting instructed by the mode sequence control unit 86 as the operation setting for the image recording operation control. In this example, the imaging operation setting instructed by the mode sequence control unit 86 includes a normal imaging setting and an unconscious imaging setting. The contents of the normal imaging setting and the unconscious imaging setting will be described later. The image recording control unit 81 controls the image recording operation based on the normal imaging setting when the normal imaging setting is instructed. In addition, the image recording control unit 81 controls the image recording operation based on the unconscious imaging setting when the unconscious imaging setting is instructed.

This image recording control unit 81 includes the function as the "imaging operation control unit" in the appended claims.

The imaging preparation processing unit 82 is a functional part which performs imaging preparation processing when the stationary imaging is executed in the automatic stationary imaging mode and in the request correspondence imaging mode.

As one of the imaging preparation processing, object detection processing can be exemplified. This is processing for placing an object (for example, a face of a person) within the field of view by checking each frame image obtained by the signal processing unit 24 while the camera platform 10 is made to execute the panning and tilting operations. In order to do so, the imaging preparation processing unit 82 performs processing such as determination for necessary panning and tilting operation of the camera platform 10, person detection through image analysis on the frame image data, face detection, and the like.

In addition, as one example of the imaging preparation processing, composition processing can be exemplified. Composition processing is processing (composition matching) for determining whether or not the arrangement of the object image within the field of view is in an optimal state (composition determination) or for adjusting the composition. In order to adjust the composition, the imaging preparation processing unit 82 performs determination of necessary panning and tilting operations of the camera platform 10, the determination of the zoom lens driving in the optical system unit 21, and the like.

In addition, it is also applicable that not the control unit 27 but the DSP (Digital Signal Processor) as the signal processing unit 24 is made to execute the image analysis processing functions for the aforementioned object detection processing and the composition processing. Accordingly, the functional part as the imaging preparation processing unit 82 can be implemented by a program and instruction provided to one or both of the control unit 27 and the DSP as the signal processing unit 24.

The field-of-view variable control unit 83 is a functional part which controls the operation to change the field of view in practice. The change in the field of view is performed through the panning and tilting of the camera platform 10 or the zoom operation of the optical system unit 21. Accordingly, the field-of-view variable control unit 83 is a functional part which performs panning and tilting control and zoom control.

When a camera operator manually captures an image with the use of the digital still camera 1, the field-of-view variable control unit 83 controls the zoom lens driving in response to the zoom operation by the camera operator, for example.

In the case of the automatic imaging mode or the request correspondence imaging mode which will be described later, the field-of-view variable control unit 83 performs zoom drive control, pan drive control, and tilt drive control in response to the determination and the instruction by the imaging preparation processing unit 82. For the pan drive control and the tilt drive control, a panning and tilting control signal is transferred to the camera platform 10 side through the communication processing unit 85.

Particularly, the panning and tilting control signal for instructing a movement amount is output to the camera platform 10 in accordance with the movement amount in the panning and the tilting determined by the imaging preparation processing unit 82 at the time of executing the composition matching and the like.

The zoom operation of the optical system unit 21 is driven and controlled in accordance with a zoom magnification determined by the imaging preparation processing unit 82.

The release announcement control unit 84 controls the release announcement which will be described later.

For example, the release announcement execution units 36 and 64 are provided in one or both of the digital still camera 1 and the camera platform 10 as described with reference to FIGS. 7 and 8. The release announcement control unit 84 performs the control to cause these release announcement execution units 36 and 64 to execute sound output, light emitting output, or display output.

In addition, when the release announcement is executed by an action of the digital still camera 1, the panning and tilting control signal is supplied to the camera platform 10 side to implement the action.

The communication processing unit 85 is a part which executes communication with the communication processing unit 71 provided on the camera platform 10 side based on a predetermined communication protocol.

The panning and tilting control signal generated by the field-of-view variable control unit 83 is sent to the communication processing unit 71 of the camera platform 10 through the communication by the communication processing unit 64.

The mode sequence control unit 86 controls the processing flow of the digital still camera 1 from the power on to the power off. For example, the mode sequence control unit 86 instructs a control scheme to be executed by the image recording control unit 81 in accordance with the automatic imaging or the manual imaging. In addition, the mode sequence control unit 86 controls each part such that the stationary imaging is performed in a predetermined operation sequence as automatic imaging when the automatic stationary imaging mode is set. Moreover, the mode sequence control unit 86 detects a predetermined trigger input during the automatic stationary imaging mode and controls the operation sequence such that the operation as the request correspondence imaging mode is performed.

That is, in each of the automatic imaging mode and the request correspondence imaging mode, the mode sequence control unit 86 appropriately causes the image recording control unit 81, the imaging preparation processing unit 82, the field-of-view variable control unit 83, and the release announcement control unit 84 to execute control processing in a predetermined order to implement the stationary imaging operation in each mode.

Moreover, the mode sequence control unit 86 instructs the image recording control unit 81 to perform the control based on the normal imaging setting at the time of imaging in the request correspondence imaging mode during manual imaging or automatic imaging. On the other hand, the mode sequence control unit 86 instructs the image recording control unit 81 to perform the control in the unconscious imaging setting at the time of imaging in the automatic stationary imaging mode.

This mode sequence control unit 86 includes the function as the "imaging setting switch control unit" in the appended claims.

The trigger receiving unit 89 is a functional part which recognizes the trigger input detected by the trigger detection unit 73 on the camera platform 10 side through the communication by the communication processing units 71 and 85 and receives the trigger input as an input for switching from the automatic stationary imaging mode to the request correspondence imaging mode. The trigger receiving unit 89 notifies the mode sequence control unit 86 of the trigger reception.

Next, the communication processing unit 71 on the camera platform 10 side is a part which executes the communication with the communication processing unit 85 on the digital still camera 1 side.

When the panning and tilting control signal is received, this panning and tilting control signal is output to the panning and tilting control unit 72.

The panning and tilting control unit 72 includes a function executing processing relating to the panning and tilting control from among the control processing controlled by the control unit 51 on the camera platform 10 side shown in FIG. 8, for example.

This panning and tilting control unit 72 controls the pan driving unit 55 and the tilt driving unit 58 shown in FIG. 8 in response to the input panning and tilting control signal. With such an operation, panning and tilting for object detection processing, panning and tilting for obtaining an optimal horizontal angle of view and an optimal vertical angle of view through composition processing, and the like are performed.

The trigger detection unit 73 is a functional part which detects the trigger input for shifting from the automatic stationary imaging mode to the request correspondence imaging mode.

As one example, if the trigger input is performed through the touch operation with respect to the touch region 60b provided in the camera platform 10 as shown in FIGS. 6A and 6B, the trigger detection unit 73 has a function to detect the input to the touch sensor.

As described above, in the configuration in which the sound input unit 62 or the imaging unit 63 in FIG. 8 detects the trigger input instead of the touch input, processing for monitoring and detecting such trigger input is performed.

This trigger detection unit 73 sends a trigger detection signal from the communication processing unit 71 to the trigger receiving unit 89 of the digital still camera 1 when the trigger input is detected.

In addition, the function of the trigger detection unit 73 may be provided on the digital still camera 1 side.

<3. Imaging Control Processing>

The operation according to an embodiment, which is implemented based on the functional configuration in FIG. 9 in the configurations of the digital still camera 1 and the camera platform 10 of this example, will be described with reference to FIG. 10.

Figure 10:
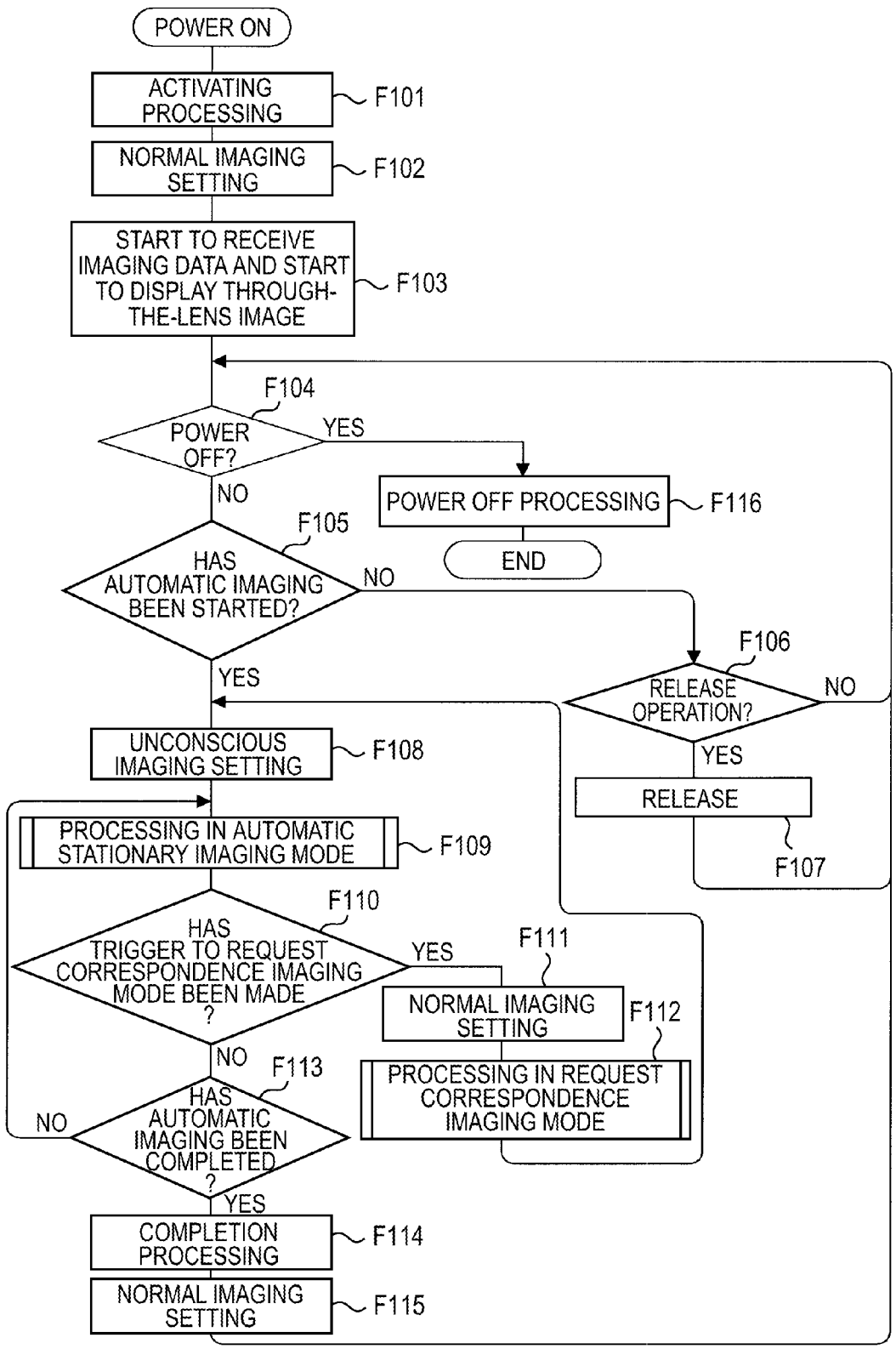
FIG. 10 is a flow chart of imaging control processing according to an embodiment.

In addition, if the functional configuration in FIG. 9 is assumed, the processing in FIG. 10 can be considered as processing by the control unit 27 of the digital still camera 1. That is, the processing which will be described later is executed by the instruction of the mode sequence control unit 86 to cause the image recording control unit 81, the imaging preparation processing unit 82, the field-of-view variable control unit 83, the release announcement control unit 84, the communication processing unit 85, and the trigger receiving unit 89 to execute their function. In addition, the operation is performed in cooperation with the communication processing unit 71, the panning and tilting control unit 72, and the trigger detection unit 73 of the control unit 51 of the camera platform 10 particularly in the automatic stationary imaging mode and in the request correspondence imaging mode.

FIG. 10 shows processing of the control unit 27 from the powering on of the digital still camera 1.

The control unit 27 performs activating processing in Step F101 by turning the power on. In addition, the control unit 27 performs a normal imaging setting in Step F102. This is processing performed in order such that the image recording control unit 81 of the control unit 27 performs imaging control in the normal imaging setting.

The normal imaging setting is an operation setting which is preferable when the object is conscious of the imaging, for example, in the case of manual imaging.

In the processing in FIG. 10, the imaging operation control in the normal imaging setting and in the unconscious imaging setting is selectively executed as the control setting for the imaging operation. The unconscious imaging setting is a control setting which is preferable when a person as an object is not conscious of the imaging on the assumption of the case of the stationary imaging in the automatic stationary imaging mode. The specific examples of the normal imaging setting and the unconscious imaging setting will be described later.

Then, in Step F103, the control unit 27 starts the receiving of the captured image data. That is, the control unit 27 causes the image sensor 22 and the signal processing unit 24 to start receiving each frame of the captured image data. In addition, the display unit 33 is made to display the through-the-lens image.

In this state, the user can check the object through the display unit 33 and perform manual imaging.

Thereafter, the control unit 27 performs monitoring processing in Steps F104, F105, and F106.

When the control unit 27 detects that the user has performed the powering off operation, the control unit 27 proceeds from Step F104 to F116, performs the powering off operation, and turns the digital still camera 1 to a power off state.

When the control unit 27 detects that the user has pressed the release button 31a as the manual imaging operation, the control unit 27 proceeds from Step F106 to F107 to execute the release processing. That is, the control unit 27 performs control on the encoding/decoding unit 25 and the media controller 26 and controls the memory card 40 to record the captured image data (frame image) obtained at that time as data of one stationary image.

In addition, the imaging performed by a user setting of release 10 seconds later as so-called self timer imaging is also processing for manual imaging in this Step F107.

Since the imaging and the recording operation in Step F107 are performed in the control setting state in Step F102, the imaging and the recording operation are performed based on the normal imaging setting.

Although not shown in FIG. 10, automatic exposure adjustment is performed by the control of the control unit 27 from Step F103. That is, control of a diaphragm mechanism in the optical system unit 21, shutter speed control of the image sensor 22, ISO sensitivity control of the image sensor 22 (gain control of the detection signal of the image sensor 22), and the like are performed.

In the case of manual imaging, automatic focusing control and the like are also performed in response to half-pressing of the release button 31a before the release operation.

The various kinds of processing before release are also executed based on the normal imaging setting.

When user performs an operation to start the automatic stationary imaging mode in the state in which the digital still camera 1 is attached to the camera platform 10, the control unit 27 proceeds from Step F105 to F108 and starts the automatic imaging in the automatic stationary imaging mode.

In addition, the operation in the automatic stationary imaging mode is not necessarily performed in the state in which the digital still camera 1 is attached to the camera platform 10, and the operation can be executed only in the digital still camera 1. It is needless to say that the panning and tilting operations by the camera platform 10 are not performed in such a case and the imaging direction is fixed.

When the start of the automatic imaging is instructed, and the processing proceeds to Step F108, the control unit 27 performs processing for switching the normal imaging setting selected in Step F102 to the unconscious imaging setting. That is, the processing is performed thereafter in order that the control unit 27 performs the imaging operation control in the unconscious imaging setting.

Then, the processing in the automatic stationary imaging mode is performed in Step F109.

The processing in the automatic stationary imaging mode will be shown in FIGS. 11A and 11B. In addition, FIG. 11A shows processing in the case in which the digital still camera 1 performs the automatic imaging in cooperation with the camera platform 10, and FIG. 11B shows processing in the case of performing the automatic imaging only by the digital still camera 1 or without performing panning and tilting operations even if the digital still camera is attached to the camera platform 10.

First, description will be made of the processing in FIG. 11A.

In the processing in the automatic stationary imaging mode in FIG. 11A, the imaging system of this example performs automatic composition matching to obtain an optimal composition determined in accordance with the object state detected in the object detection as a target composition through respective operations including object detection (search), optimal composition determination, and composition matching as the imaging preparation. Then, the release processing is automatically preformed under predetermined conditions. With such a configuration, it is possible to perform appropriate stationary imaging without the operation by the camera operator.

If the imaging operation in the automatic imaging mode is started, the control unit 27 performs object detection processing in Step F121 in FIG. 11A and performs composition processing in Step F122.

The object detection processing and the composition processing (optimal composition determination, composition matching) are executed by the function of the imaging preparation processing unit 82 of the control unit 27.

After the start of the receiving of the captured image data in the above Step F103, the signal processing unit 24 sequentially obtains the frame image data corresponding to one stationary image as captured image data by the image sensor 22.

The control unit 27 performs processing for detecting an image part corresponding to a face of a person in each piece of the frame image data as the object detection processing.

In addition, the object detection processing may be performed for each of all the frames or may be performed with intervals of a predetermined number of frames, which has been set in advance.

In the object detection processing in this example, a face frame (a frame of a face image region) corresponding to a region of an image part of a face for each object detected in the image is set with the use of a so-called face detection technique, for example. In addition, information regarding the number, the sizes, the positions, and the like of the objects in the image frame is obtained based on the information of the number, the size, the position, and the like of the face frames.

Although some methods for face detection are known, a detection method which is to be employed in this embodiment is not particularly limited, and an appropriate method may be arbitrarily employed in consideration of precision in detection, the difficulty level in design, and the like.

First, the objects around the digital still camera 1 are searched for as the object detection processing in Step F121.

Specifically, as the searched for objects, object detection through the image analysis is performed while the field of view is changed by the control unit 27 in the digital still camera 1 performing the panning and tilting control on the camera platform 10 and the zoom control on the optical system unit 21.

Such object search is executed until the objects are detected in the frame image as the captured image data. Then, the object search is completed when the state in which objects (faces of persons) are present within the frame image, that is, the field of view at that time point is obtained.

After the completion of the object detection processing, the control unit 27 performs composition processing in Step F122.

Specifically, determination is made regarding whether or not the composition at that time point is in an optimal state as the composition processing. In such a case, the determination of the image configuration (determination of the number of the object in the image composition, the sizes of the objects, the positions of the objects, and the like in this case) based on the object detection result is performed, and an optimal composition is then determined by a predetermined algorithm based on the information regarding the image configuration determined in the image configuration determination.

Here, the composition in this case is set by each field of view including panning, tilting, and zooming, and therefore, the information regarding the control amount in panning, tilting, and zooming to obtain the optimal field of view in accordance with the object detection result (object states in the image frame) are obtained as a determination result depending on the determination processing regarding whether or not the composition is in the optimal state.

When the composition is not in an optimal state, the panning and tilting control and zooming control are performed as composition matching so as to obtain an optimal composition state.

Specifically, the control unit 27 instructs the control unit 51 on the camera platform 10 side with the information for changing each of the control amounts of panning and tilting obtained in the optimal composition determination processing as the composition matching control.

In accordance with this instruction, the control unit 51 of the camera platform 10 obtains the movement amounts of the panning mechanism unit 53 and the tilting mechanism unit 56 in accordance with the instructed control amounts and supplies control signals to the pan driving unit 55 and the tilt driving unit 58 so as to perform the pan driving and the tilt driving by the thus obtained movement amounts.

In addition, the control unit 27 causes the optical system unit 21 to perform a zoom operation so as to obtain the instructed angle of view by instructing the optical system unit 21 with the information regarding the angle of view for zooming obtained in the optimal composition determination processing.

When the determination that the composition is not in the optimal state is made in the composition processing, and panning, tilting, and zooming control are performed as composition matching, the processing in Step F122 is temporarily completed, and the processing is performed again from the object detection processing in Step F121. This is because the object is deviated from the field of view due to the panning, tilting, and zooming operation or the movement of the person in some cases.

The control unit 27 performs release timing determination processing in Step F123 when an optimal composition is obtained. That is, the panning and the tilting are stopped to fix the field of view in the state in which the optimal composition is obtained, and the release timing determination in Step F123 is performed.

In such a case, it can be considered that the release is performed with the condition that the object comes to be in a predetermined state such as smiling, for example.

The release timing is determined not to be OK in the release timing determination processing in Step F123 in some cases, the processing is performed again from the object detection in Step F121 in such a case. This is because the object is deviated from the field of view or the composition is changed due to the movement of the person or the like in some cases.

When the determination that the release condition is satisfied is made in the release timing determination processing, automatic recording of the captured image data is performed as the release processing in Step F124. Specifically, the control unit 27 controls the encoding/decoding unit 25 and the media controller 26 to cause the memory card 40 to record the captured image data (frame image) obtained at that time point.

The stationary imaging in the automatic stationary imaging mode is executed based on the above control and processing by the control unit 27 shown in FIG. 11A.

As the release timing determination processing in Step F123, the following examples can be considered.

First, there is an example in which the release timing is determined in accordance with the elapsed time. For example, processing in which the release timing is set immediately after the completion of the composition processing and the processing in which the release timing is set several seconds after the completion of the composition processing can be considered.

In addition, processing can also be considered in which the release timing is set after predetermined time elapse from the last release processing in order to perform imaging at constant timing. In addition, this is an example of the release timing determination which is more suitable for the processing example in FIG. 11B which will be described next.

In addition, release timing determination in accordance with the position can also be considered. For example, every time the panning or the tilting operation by a certain angle is performed as the panning and tilting operation by the camera platform 10, determination is made in which the release timing is achieved. This is also an example which is suitable for the processing example in FIG. 11B which will be described next.

The following processing can be considered in which the object state is determined through the image analysis and release timing is set.

The timing at which a person as an object smiles is set to release timing.

The timing at which the number of the persons as objects is changed is set to release timing.

The timing at which a position of a person as an object enters in a certain position is set to release timing.

The timing at which the size of the object becomes equal to or greater than a certain size is set to release timing.

The timing at which persons as objects face each other is set to release timing.

The timing at which persons as objects come close to each other is set to release timing.

The timing at which the directions of eyes of persons as objects face each other is set to release timing.

The timing at which the distance between persons as objects is shortened is set to release timing.

The timing at which a composition is adjusted or change is made in a combination of the above examples is set to release timing.

In addition, as examples in which the release timing is set based on the surrounding sound obtained by the sound input unit 35, the following processing can also be considered.

The timing at which the volume of the sound is instantaneously turned up is set to release timing.

The level of the sound or the frequency spectrum is monitored, and the timing at which determination of exciting atmosphere is made is set to release timing.

The detection time point of crying or laughing is set to release timing.

Specific sound such as clapping sound, whistle sound, or the like is determined, and the timing at which the specific sound is detected is set to release timing.

In the above manner, for example, the control unit 27 performs release timing determination in Step F123 based on the time/position, image analysis, surrounding sound detection, or the like. Then, the control unit 27 performs release processing in Step F124. The imaging through the release timing determination is an imaging operation on the assumption of the situation in which a person as an object is not conscious of the imaging.

As an action of the imaging system viewed by a user in practice, the digital still camera searches an object and performs stationary imaging at an arbitrary time point while the camera platform 10 automatically performs a panning and tilting operation or zooming operation of the digital still camera 1. That is, the action appears as if the imaging system decided an object by itself and performed stationary imaging while a camera operator is not present.

In such a case, since a camera operator is not present, it is possible to easily perform stationary imaging in a natural atmosphere in which a user is not conscious of imaging.

The processing example in FIG. 11B is a processing example in which Steps F121 and F122 in FIG. 11A are not performed. That is, the release timing is automatically determined (F123) while the imaging direction is fixed without executing the object detection and the composition processing by panning, tilting, and zooming, and the release processing is performed (F124).

This is an example when the automatic stationary imaging is performed only by the digital still camera 1, or when the automatic stationary imaging is performed without causing the camera platform to function even if the digital still camera 1 is attached to the camera platform 10. In addition, it is also applicable that the composition processing through the zoom adjustment is automatically performed in the processing in FIG. 11B.

In such a case, as the action of the digital still camera 1 or the imaging system viewed by the user in practice, the action appears as if the digital still camera 1 or the imaging system performed stationary imaging on its own while the digital still camera 1 is fixed and a camera operator is not present. In such a case, it is also possible to easily perform the stationary imaging in a natural atmosphere in which a user is not conscious of imaging.

For example, the imaging control in the automatic stationary imaging mode performed as in FIG. 11A or FIG. 11B is performed in the state in the unconscious imaging setting in Step F108.

It can be considered that the release timing determination in Step F123 is performed in the example as described above in the state in which a person as an object is not conscious of imaging. Therefore, the imaging operation control is performed in the unconscious imaging setting which is preferable for the situation in which a person as an object is not conscious of imaging.

Here, the control unit 27 monitors the trigger input to the request correspondence imaging mode in Step F110 during the time period in which the processing in the automatic stationary imaging mode in Step F109 is performed.

Although not shown in FIG. 11A or 11B, the control unit 27 monitors the presence of the trigger input during the execution of each step in FIG. 11A or 11B.

Description will be made of an example in which the touch region 60b is formed in the camera platform 10 as shown in FIG. 7A and the user touch operation with respect to the touch region 60b is the trigger input to the request correspondence imaging mode.

In addition, if the trigger input is not particularly detected, the imaging in the automatic stationary imaging mode in Step F109 is continuously performed until the determination of the completion of the automatic imaging is made in Step F113 in FIG. 10. That is, during the processing time period for each step in FIG. 11A or 11B, the user completion operation is also monitored while the presence of the trigger input is checked.

When a user instructs the completion of the automatic imaging through a predetermined operation, the control unit 27 proceeds the processing in FIG. 10 from Step F113 to Step F114, performs predetermined completion processing, and completes the automatic stationary imaging mode.

Furthermore, the unconscious imaging setting set until the time is returned to the normal imaging setting in Step F115. Then, the processing returns to the monitoring loop in Steps F104, F105, and F106.

When a user performs the touch operation in the touch region 60b of the camera platform 10 in the automatic stationary imaging mode, the control unit 51 of the camera platform 10 detects this touch operation and sends the trigger detection signal to the control unit 27.

With such operations, the control unit 27 recognizes and receives the fact that the trigger input has been made, proceeds the processing in FIG. 10 from Step F110 to F111, switches the setting to the normal imaging setting, and then performs the operation control in the request correspondence imaging mode in Step F106.

The processing example in the request correspondence imaging mode as Step F112 will be shown in FIGS. 12A, 12B, and 12C.

First, description will be made of a processing example in FIG. 12A.

In Step F131, the control unit 27 performs object detection processing.

In Step F132, the control unit 27 performs composition processing.

The object detection processing and composition processing are processing performed to decide the field of view in accordance with the imaging request.

As one example, it can be considered that the object detection processing in Step F131 and the composition processing in Step F132 are processing based on the same algorithm as that in the object detection processing in Step F121 and the composition processing in Step F122 in FIG. 11A in the automatic stationary imaging mode.

Here, the request correspondence imaging mode is a mode in which the stationary imaging is performed in response to the user request. Accordingly, it is necessary to recognize the user who has performed the imaging request (touch operation) as an object in order to do so. This is the processing which decides the field of view in accordance with the imaging request.

When the touch region 60b is installed on the front side of the main body 11 of the camera platform 10 as shown in FIG. 7A, it can be assumed that the user who has performed the imaging request (touch operation) is present on the front side of the imaging system.

Accordingly, it can be considered that when the algorithm for the object detection is the algorithm in which the initial position is set to be in the panning state in the front direction (the pan reference position in FIG. 4) and set to be at the tilting reference position shown in FIGS. 5A and 5B, the user can be positioned within the field of view in most cases if the object detection and the composition processing is performed in the state. For this reason, the object detection processing in Step F131 and the composition processing in Step F132 may be performed such that the processing based on the same algorithm as that in the automatic stationary imaging mode is started from the initial state.

However, in order to effectively perform the stationary imaging in the request correspondence imaging mode, it is appropriate in some cases to perform the object detection and the composition processing based on the algorithm which is different from that in the automatic imaging mode. Such cases will be described later.

When an optimal composition is obtained in the processing in Steps F131 and F132, the control unit 27 controls release announcement processing in Step F133.

As described with reference to FIG. 7, when the release announcement execution unit 36 is provided on the digital still camera 1 side, the control unit 27 causes the release announcement execution unit 36 to perform a predetermined operation.

For example, the release announcement execution unit 36 is controlled to execute LED blinking display, emit light at a certain blinking cycle with a certain blinking pattern, generate electronic sound, or generate message sound such as "say cheese" or the like.

In addition, when the release announcement is made by an action of panning and tilting operations such as shaking or a nodding action of the digital still camera 1, the release announcement control unit 84 instructs the field-of-view variable control unit 83 to send a panning and tilting control signal for executing such an action to the camera platform 10 side.

It is matter of course that the release announcement employing some of the above examples together may be performed.

The release announcement makes it possible for a user to set posture or facial expression by predicted release timing.

After the release announcement, the control unit 27 performs release processing in Step F134 and records the stationary image data in the memory card 40.

It can be considered that the control unit 27 performs release processing to execute the stationary imaging operation after the execution or after the start of the execution of the release announcement operation when predetermined stationary imaging conditions are satisfied.

For example, it is possible to assume the determination that the above stationary imaging conditions are satisfied is made when there is a specific sound input, when a specific object state is determined in the captured image, when a predetermined time elapses after the execution or after the start of the execution of the release announcement operation.

As the specific sound input, a specific word spoken by a user, clapping sound, whistling sound, or the like is detected.

As the specific object state, a state is detected in which a action such as changing of the face of an object caught in the composition processing to a specific facial expression such as smiling, performing a specific gesture such as waving a hand to the imaging system, raising a hand, clapping, throwing a deuce, winking to or gazing of the imaging system, or the like is performed.

The predetermined time elapse means elapse of a predetermined time period (several seconds, for example) after execution or from the time point of starting the execution of the release announcement operation.

It is also applicable that the control unit 27 performs necessary detection processing while using them as the stationary imaging conditions and is controlled by the image recording control unit 81 to perform the release processing (that is, recording of the stationary image) when the stationary imaging conditions are satisfied.

The control unit 27 returns the processing to Step F102 after stationary imaging, completes the request correspondence imaging mode, and perform processing in the automatic imaging mode again.

If the stationary imaging is performed in the automatic imaging mode by performing the processing in this request correspondence imaging mode, a user may perform a touch operation when the user desires to be imaged. Then, the stationary imaging is performed in response to the user's request by the operation in the request correspondence imaging mode. The user can be imaged with a desired facial expression, a desired direction of eyes, a desired posture, and the like due to the release announcement as well performed at this time.

As an example of the processing in the request correspondence imaging mode,

FIG. 12B shows an example in which the object detection and the composition processing are not performed. That is, when the processing in the request correspondence imaging mode is performed in Step F112, the release announcement processing is performed in Step F133, and the release processing is performed in Step F134.

In addition, FIG. 12C shows an example in which the release processing is performed in Step F134 in response to the trigger input such as a touch operation or the like.

FIGS. 12B and 12C are processing examples in the request correspondence imaging mode performed only with the digital still camera 1 or without the execution of the panning and tilting operations of the camera platform 10.

In addition, the above imaging in the request correspondence imaging mode as shown in FIGS. 12A, 12B, and 12C is performed when a user requests imaging through a touch operation or the like. That is, the imaging in the request correspondence imaging mode is performed when a person as an object is conscious of imaging.

Thus, in this example, the unconscious imaging setting during the automatic stationary imaging mode is switched to the normal imaging setting in Step F111, and the imaging in the request correspondence imaging mode is then performed in Step F112.

When the processing in the request correspondence imaging mode is completed in Step F112, the operation mode returns to the automatic stationary imaging mode again. At this time, the setting is switched to the unconscious imaging setting in Step F108, and the processing in the automatic stationary imaging mode is then performed in Step F109.

In addition, various modifications can be considered for the trigger for the request correspondence imaging mode monitored in Step F110 and for processing in the request correspondence imaging mode in Step F112.

The above description was made of an example in which the user's touch operation on the camera platform 10 is used as a trigger operation. As the touch operation, it is also applicable that a touch region is provided on the case body of the digital still camera 1 and the imaging system recognizes the trigger operation when the user touches the touch region of the digital still camera 1.

In addition, as a user's operation for a trigger input, it is also applicable to provide an operation button in the camera platform 10 or the digital still camera 1 and the operation of the operation button is recognized as the trigger input.

Moreover, it is also applicable that the user can perform the trigger operation with an operation using a remote controller based on a wireless or wired scheme with the use of an infrared ray or a radio wave.

In addition, it can also be considered that the control unit 51 (trigger detection unit 73) detects a specific sound input as a rigger input. For example, as described with reference to FIG. 9, the camera platform 10 is provided with a sound input unit 62, and the control unit 51 recognizes a specific sound input.

The specific sound input includes a certain word such as "shoot me!" spoken by a user, clapping sound, and the like.

The sound input unit 62 performs analysis processing on the input sound signal and determines whether such a specific sound input has been made. Then, when the specific sound input was made, recognition is made of the fact that the trigger input has been made.

It is matter of course that it is also applicable to provide a function as the trigger detection unit in the control unit 27 on the digital still camera 1 side and perform trigger input determination on the sound signal from the sound input unit 35 shown in FIG. 7.

In addition, it can also be considered that the trigger detection unit 73 detects that that trigger input has been made if a specific object state is determined in the captured image.

For example, the camera platform 10 is provided with the imaging unit 63 as described with reference to FIG. 8, and the control unit 51 (trigger detection unit 73) recognizes the specific object state detected in the captured image as a trigger input.

As the specific object state, an action including a specific gesture such as waving a hand to the imaging system, raising a hand, clapping, throwing a deuce, winking to the imaging system, or the like can be considered. Alternatively, user's gazing of the imaging system can also be considered.

The imaging unit 63 or the trigger detection unit 73 determines such user's specific gesture or determines the direction of user's eyes through the image analysis processing on the captured image. Then, when the specific object state is detected, recognition is made of the fact that the trigger input has been made.

In addition, if a function as the trigger detection unit is provided in the control unit 27 on the digital still camera 1 side in addition to the trigger receiving unit 89, since it is possible to recognize the action or the direction of eyes as such a specific object state in the process of the image analysis by the signal processing unit 24, that is, the process of the object detection, it is possible to detect the trigger input by the specific object state and receive the trigger for the request correspondence imaging mode.

Any trigger described above is applicable as long as it is made when a user consciously desires imaging.

Various examples of the imaging preparation processing in the request correspondence imaging mode in Steps F131 and F132 in FIG. 12A can also be considered.

For example, the control unit 27 determines a request direction by the trigger input. The request direction means a direction in which a user who has performed the trigger input is present while the position of the imaging system is set as a reference position, that is, the direction of the trigger input. Then, the control unit 27 performs panning and tilting control toward the request direction to direct the imaging direction of the digital still camera 1 to the above request direction in Step F131.

For example, if a touch operation is employed as a trigger input, the touch regions 60*b* to 60*d* are formed in plural directions as shown in FIG. 7B.

When a touch operation is detected, the control unit 51 (trigger detection unit 73) of the camera platform 10 delivers the information regarding which one of the touch regions 60*b* to 60*d* the user has touched (or information regarding the trigger input direction) to the control unit 27 (the trigger receiving unit 89, the mode sequence control unit 86) of the digital still camera 1 along with the trigger detection signal. Thus, the control unit 27 performs request direction determination in Step F120.

When the trigger input direction is determined, the control unit 27 outputs the panning and tilting control signal such that the imaging direction of the digital still camera 1 directs the trigger input direction (request direction) in Step F121. With this operation, panning and tilting operations are performed on the camera platform 10 side, and the digital still camera 1 directs the direction in which the user is present.

That is, as the imaging preparation processing, the digital still camera 1 is firstly caused to direct the request direction as if the digital still camera 1 responded to the user's request.

The control unit 27 performs object detection and the composition processing in this state.

With such a configuration, the user who has requested imaging is easily positioned within the composition, and the stationary imaging desired by the user can easily be implemented.

Even when the trigger input is made through a sound input, such processing is possible.

For example, plural microphones are prepared in the sound input unit 35 (or 62), and the direction in which the aforementioned specific sound input has been generated is determined based on the temporal difference among sound signals which have respectively obtained by the microphones.

The control unit 27 can perform the panning and tilting control in the request direction in Step F131 by determining the direction, in which the user who has requested is present, based on the sound input.

As an actual action, the imaging system responses to the user's call, turns to the user, and then performs the stationary imaging including the user.

As described above, according to the processing in FIG. 10, the imaging control operation in this embodiment is performed in the normal imaging setting in the case of the manual imaging (F107) and in the case of the imaging in the request correspondence imaging mode (F112). They are cases in which it is assumed that a person as an object is conscious of imaging.

On the other hand, the imaging in the automatic stationary imaging mode (F109) in which it is assumed that a person as an object is not conscious of imaging is performed in the unconscious imaging setting.

Hereinafter, description will be made of examples in the normal imaging setting and the unconscious imaging setting.

<4. Examples of Normal Imaging Setting and Unconscious Imaging Setting>

While the normal imaging setting is selected when a person as an object is conscious of being images, the operation setting from the following view points (1) to (3) are appropriate in the unconscious imaging setting suitable for the case in which a person as an object is not conscious of imaging.

(1) imaging operation setting in order to reduce blur of the object (2) imaging operation setting in order to reduce the possibility of weird facial expressions (3) unnoticeable setting Hereinafter, each of them will be described.

(1) Imaging Operation Setting in Order to Reduce Blur of Object

When a person as an object is not conscious of imaging, it is matter of course that the person freely acts without making a posture or without trying not to move while considering the release timing. For this reason, more blur tends to be generated in the image (stationary image data) captured in the automatic stationary imaging mode due to the movement of the person as the object.

Thus, the operation setting in order to reduce such blur of the object is performed.

(1-1) Shutter Speed Setting

The unconscious imaging setting is an imaging operation setting in which the shutter speed is set to be higher than that in the normal imaging setting. That is, the exposure time of the image sensor 22 is set to be shorter. By setting the shutter speed to be higher, it is possible to reduce the blur of the object.

For example, it can be considered that the shutter speed is set to the speed (1/50 seconds, for example) designated by the user in the normal imaging setting while the shutter speed is set to be higher (1/60 seconds) in the unconscious imaging setting when a user sets a fixed shutter speed.

(1-2) Exposure Adjustment Operation Setting

The exposure adjustment operation in the normal imaging setting is the setting in which the imaging sensitivity is raised after a stage is reached in which the shutter speed is lowered to a first predetermined speed in accordance with decrease in the light intensity. On the other hand, the exposure adjustment operation in the unconscious imaging setting is the setting in which the imaging sensitivity is raised after a stage is reached in which the shutter speed is lowered to a second predetermined speed, which is higher than the first predetermined speed, in accordance with decrease in the light intensity.

FIGS. 13A and 13B show examples. FIG. 13A shows an exposure adjustment operation example in the normal imaging setting.

The automatic exposure adjustment is performed with respect to contrasting of the object light intensity (incident light intensity). For example, after the start of the receiving of the captured image data in Step F103 in FIG. 10 as described above, the exposure adjustment is continuously performed.

The exposure adjustment is performed through control of the diaphragm in the optical system unit 21, shutter speed control of the image sensor 22, and sensitivity control (gain control of the exposure signal) of the ISO of the image sensor 22. For example, the control unit 27 detects the object light intensity based on the average luminance level, the weighted average luminance level, or the like of the captured image data and performs the diaphragm control, the shutter speed control, and the ISO sensitivity control based on the detection.

Here, FIG. 13A shows the exposure adjustment in accordance with the contrasting level of the object light intensity. First, the exposure adjustment is performed by opening and closing of the diaphragm for light intensity section in which the light intensity is equal to or greater than a level L1. The exposure adjustment is performed by the shutter speed control and the ISO sensitivity control while the diaphragm mechanism is maintained in a completely opened state when the light intensity is lower than the level L1.

In this example, the exposure adjustment is performed by the shutter speed control in the sections whose light intensity is from the levels L1 to L3. Although this is just an example, if the shutter speed is set to $\frac{1}{100}$ seconds for the section whose light intensity is equal to or greater than L1, the shutter speeds are set to be gradually lowered in the sections whose light intensity is from the level L1 to L3. For example, the shutter speed is set to $\frac{1}{10}$ seconds in the case of the level L3.

Then, if the light intensity level is further lowered after the shutter speed has reached $\frac{1}{10}$ seconds, the ISO sensitivity control is performed. For example, the ISO sensitivity is set so as to gradually become higher from 100 in accordance with decrease in the light intensity.

While the exposure adjustment operation is performed as described above in the normal imaging setting, the exposure adjustment operation is performed as shown in FIG. 13B in the unconscious imaging setting.

First, the exposure adjustment is performed on the light intensity section in which the light intensity is equal to or grater than the level L1 by opening and closing of the diaphragm mechanism in the same manner as in the normal imaging setting. The exposure adjustment is performed by the shutter speed control and the ISO sensitivity control while the diaphragm mechanism is maintained in a completely opened state when the light intensity is lower than the level L1.

In this example, the exposure adjustment is performed by the shutter speed control in the sections whose light intensity is the level L1 to L2. If the shutter speed is set to $\frac{1}{100}$ seconds for the section whose light intensity is equal to or greater than the level L1, the shutter speeds are set to be gradually lowered in the sections whose light intensity is the level L1 to L2. For example, the shutter speed is set to $\frac{1}{40}$ seconds in the case of the level L2.

Then, if the light intensity level is further lowered after the shutter speed has reached $\frac{1}{40}$ seconds, the ISO sensitivity control is performed. For example, the ISO sensitivity is set so as to gradually become higher from 100 in accordance with decrease in the light intensity.

In this case, when the ISO sensitivity reaches limitation, which is appropriate for the automatic imaging, in the level L4, the decrease in the light intensity thereafter is handled by the shutter speed control. That is, the shutter speed is set so as to gradually become lower from $\frac{1}{40}$ seconds in the sections whose light intensity is lower than the level L4.

In the unconscious imaging setting in FIG. 13B, the shutter speed is higher in the section in which the light intensity is lower than the level L2 as compared with the normal imaging setting in FIG. 13A. That is, the exposure adjustment is performed so as not to lower the shutter speed than a certain level of speed ($\frac{1}{40}$ seconds in this example) if possible.

With such a configuration, the shutter speed hardly becomes lowered, and the shutter speed is higher in more cases at the time of imaging in the unconscious imaging setting as compared with imaging in the normal imaging setting. Accordingly, the function of reducing blur of the object works effectively in the unconscious imaging setting.

(1-3) Superimposing Synthesis

The normal imaging setting is a setting in which stationary image data is obtained from the captured image data for one frame in accordance with the release timing as stationary image data generation processing for recording the stationary image as an imaging result. On the other hand, the unconscious imaging setting is a setting in which stationary image data is obtained by performing superimposing synthesis processing on the captured image data for plural frames in accordance with the release timing as stationary image data generation processing for recording the stationary image as an imaging result.

Figures 14A, 14B, 14C:
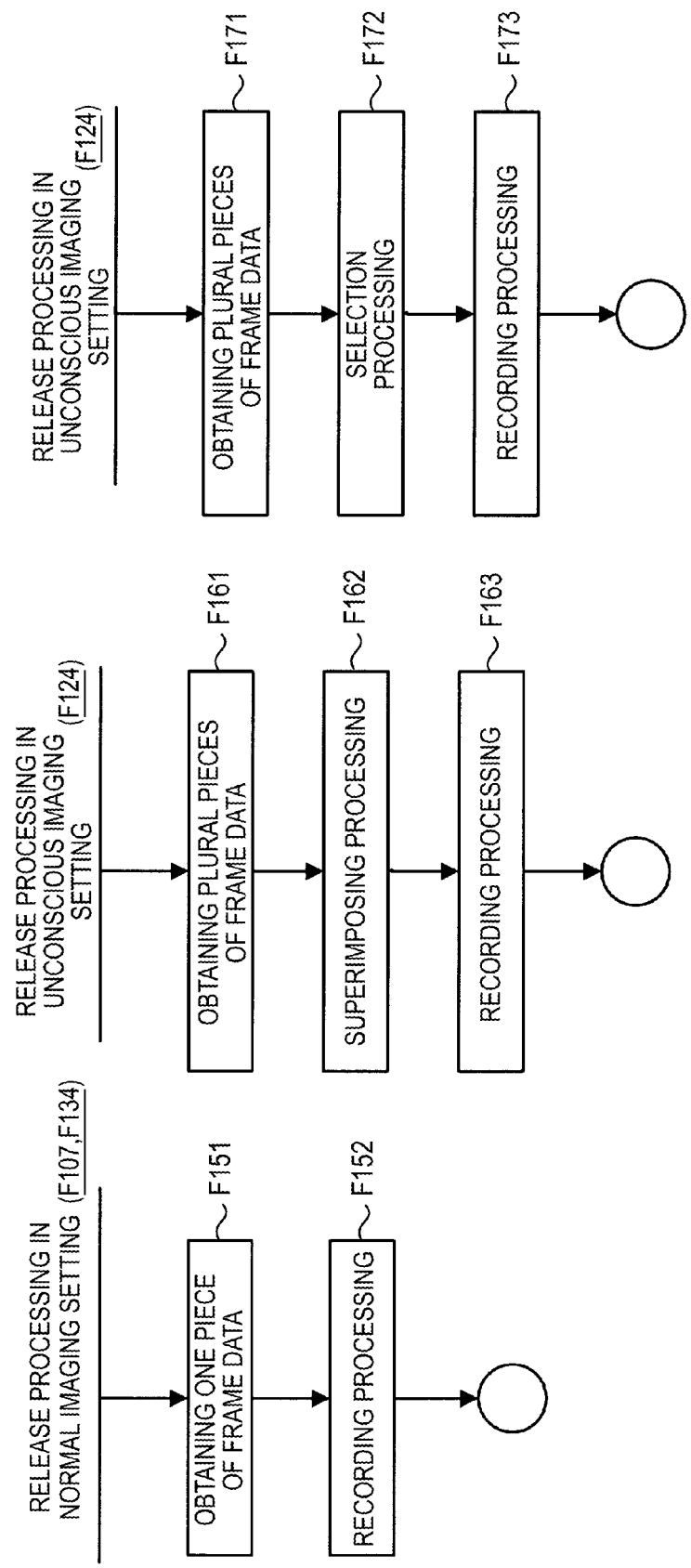
FIGS. 14A to 14C are flow charts of release processing based on each setting according to an embodiment.

FIGS. 14A and 14B show control processing examples by the control unit 27 during the release processing.

FIG. 14A shows a release processing example in the normal imaging setting. That is, FIG. 14A shows release processing performed in Steps F107 and F112 in FIG. 10 (F134 in FIGS. 12A to 12C).

In this case, the control unit 27 causes the signal processing unit 24 to obtain one frame as the captured image data to be recorded as a stationary image in accordance with the timing of the user's release operation or the release timing in the request correspondence imaging mode in Step F151. That is, the signal processing unit 24 is caused to extract one frame in accordance with the release timing as the image data to be subjected to the recording processing.

Then, the recording processing is performed on the image data for the one frame in Step F152. That is, the signal processing unit 24 is caused to execute predetermined processing so as to obtain the stationary image data for recording the extracted one frame and transfer the stationary image data to the encoding/decoding unit 25. Then, the encoding/decoding unit 25 is caused to execute compression encoding and the like for recording, and the media controller 26 records the stationary image data in the memory card 40.

FIG. 14B is a release processing example in the unconscious imaging setting. That is, FIG. 14B shows release example performed in Step F109 in FIG. 10 (F124 in FIGS. 11A and 11B).

In this case, the control unit 27 causes the signal processing unit 24 to obtain (extract) plural frames as the captured image data to be used in the recording processing of the stationary image in accordance with the release timing in the automatic stationary imaging mode in Step F161. Then, the control unit 27 instructs the signal processing unit 24 to perform superimposing processing in Step F162. The superimposing processing is processing for reducing noise by performing block matching of plural frames and superimposing and synthesizing parts including the same image contents as disclosed in JP-A-2009-55410. The image data as the result of this superimposing processing is the stationary image data to be recorded.

Then, the control unit 27 performs recording processing on the image data after the superimposing processing in Step F163. That is, the control unit 27 causes the signal processing unit 24 to transfer the superimposed image data to the encoding/decoding unit 25. Moreover, the encoding/decoding unit 25 is caused to perform the compression encoding and the like for recording, and the media controller 26 records the superimposed image data in the memory card 40.

As described above, the processing at the time of release is made to be different in the normal imaging setting and in the unconscious imaging setting. In the unconscious imaging setting, it is possible to lower the possibility of blur of the object by performing superimposing processing.

(2) Imaging Operation Setting in Order to Reduce the Possibility of Weird Facial Expressions When a person as an object is not conscious of imaging, the facial expression of the person is not necessarily good at the time of release since the person is not conscious of the release timing. There is a high possibility that the image of the undesirable facial expression such as closing of its eyes, half-opening of its mouth, and the like is captured. Thus, the operation setting is made such that the image of the undesirable facial expression is hardly captured.

(2-1) Selection Processing

The normal imaging setting is a setting in which the stationary image data is obtained from the captured image for one frame in accordance with the release timing as the stationary image data generation to be recorded as an imaging result. On the other hand, the unconscious imaging setting is a setting in which the stationary image data is obtained by performing selection processing for the captured image data for plural frames in accordance with the release timing as the stationary image data generation to be recorded as an imaging result.

FIGS. 14A and 14C show control processing examples of the control unit 27 during the release processing.

The release processing in the normal imaging setting is the processing as described above with reference to FIG. 14A.

FIG. 14C shows a release processing example in the unconscious imaging setting. That is, FIG. 14C shows a release processing performed in Step F109 in FIG. 10 (F124 in FIGS. 11A and 11B).

In this case, the control unit 27 causes the signal processing unit 24 to obtain (extract) plural frames as the captured image data used in the recording processing of the stationary image in accordance with the release timing in the automatic stationary imaging mode in Step F171. Then, the control unit 27 performs selection processing in Step F172. In this case, the control unit 27 (or the signal processing unit 24) performs image analysis processing on the extracted plural pieces of captured image data. Particularly, the control unit 27 (or the signal processing unit 24) performs analysis on a facial part of a person. Then, determination is made for an image in which a person as an object closes its eyes and for an image in which the person opens its eyes. For example, the determination is made based on the size of eyes. Then, an image in which the biggest eyes appear (that is, the eyes are opened) is selected.

If one piece of the captured image data is selected as a result of the image analysis, the control unit 27 performs recording processing on the thus selected captured image data in Step F173. That is, the control unit 27 causes the signal processing unit 24 to transfer the selected captured image data to the encoding/decoding unit 25. Then, the encoding/decoding unit 25 is caused to perform compression encoding and the like for recording, and the media controller 26 records the captured image data in the memory card 40.

As described above, the processing at the time of release is made to be different in the normal imaging setting and in the unconscious imaging setting. In the unconscious imaging setting, it is possible to lower the possibility of the photograph including weird facial expression, which is not desired by a person as an object, by performing the selection processing.

In addition, the selection processing may be configured to select an image in which the mouse is closed although the description was made of a case of selecting an image in which eyes are opened. Moreover, it is also applicable to select an image with the highest possibility of smiling. In addition, it is also possible to combine the determination of smiling and the determination of mouth opening. Smiling is determined based on the determination of eyes, angle of mouth, and the like while mouth opening is determined based on the size of the mouth. It is also applicable that the selection is made by setting a priority order such as "an image of smiling", "an image in which the mouth is closed", and "an image in which the mouth is opened but the person is not smiling".

In addition, it can also be considered to select a frame image which is the most preferable in the overall determination by respectively scoring the size of eyes, the size of mouth, the level of smiling, and the blur level of the object in consideration of the aforementioned blur of the object.

(2-2) Shutter Speed Setting

Although the description was made above in which it is possible to reduce blur of the object by setting the shutter speed to be higher, the high shutter speed is also effective to prevent a person as an object from being imaged when the person closes its eyes. That is, it is possible to reduce the possibility in that an image is captured at a moment of eye blinking by setting a high shutter speed in consideration of the timing of person's eye blinking.

Accordingly, the shutter speed in the unconscious imaging setting is set to be higher than that in the normal imaging setting. For example, when a user has designated a fixed shutter speed, the designated shutter speed is employed in the normal imaging setting while imaging is performed at a higher speed than the designated shutter speed in the unconscious imaging setting.

As the exposure adjustment operation, the adjustment control schemes are set to be different in the normal imaging setting and in the unconscious imaging setting as described above with reference to FIGS. 13A and 13B.

It is possible to reduce the possibility of an image in which the person closes its eyes according to such a setting.

(3) Unnoticeable Setting

Imaging in the automatic stationary imaging mode is also performed in order to capture an image of natural facial expression when a person as an object is not conscious of imaging. Therefore, it is effective that the user is not conscious of the release timing. In addition, if a user can easily recognize the automatic imaging, the imaging bothers the user. If a user notices that an image is to be captured when the user enjoys taking in a party or the like, for example, the taking may be disturbed since the user is conscious of imaging, or the atmosphere is turned off since the user pays attention to the camera.

Accordingly, it is possible to consider a setting in which the release operation is unnoticeable as the unconscious imaging setting in the automatic stationary imaging mode.

That is, the normal imaging setting is an operation setting in which predetermined light emission or sound generation is performed at or around the imaging timing while the unconscious imaging setting is an operation setting in which neither the predetermined light emission nor the sound generation is performed at or around the imaging timing.

Figure 15B:
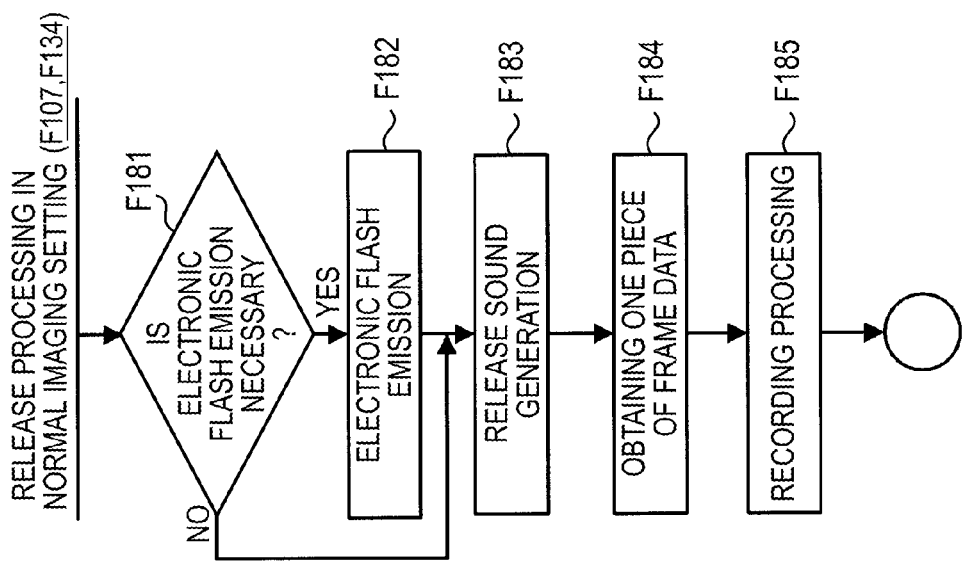
FIGS. 15A and 15B are flow charts of release processing based on each setting according to an embodiment.
Figure 15A:
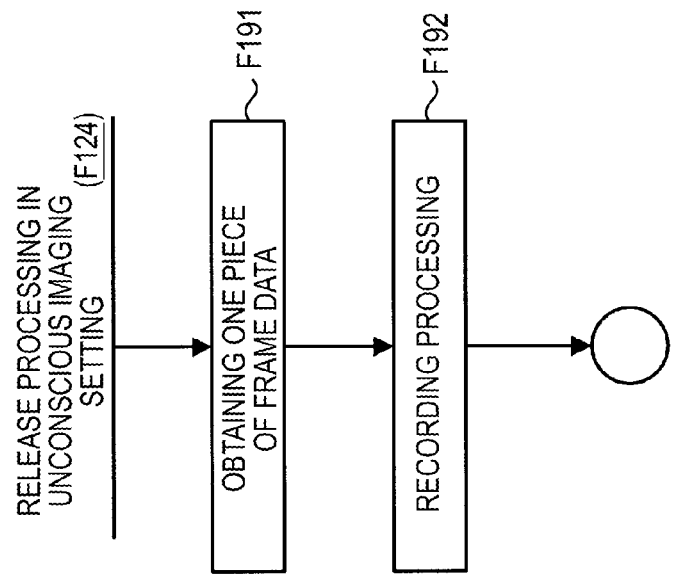

FIGS. 15A and 15B show control processing examples of the control unit 27 during the release processing.

The release processing performed in the normal imaging setting, that is, the release processing performed in Steps F107 and F112 in FIG. 10 (F134 in FIGS. 12A to 12C) is the processing shown in FIG. 15A. In this case, the control unit 27 performs strobe light determination in Step F181 at the timing of the user's release operation or the release timing in the request correspondence imaging mode.

For example, when the user sets a mode of emitting strobe light, determination is made that strobe light is emitted. When the user sets a mode of automatically emitting strobe light in accordance with the external light intensity, the controller 27 determines execution or non-execution of strobe light emission in accordance with the external light intensity.

When determination is made that strobe light is to be emitted, the processing proceeds to Step F182, and the strobe light emitting unit 37 is caused to emit light.

Moreover, the control unit 27 causes a sound generation unit 38 to generate sound (so-called shutter sound) in Step F184.

FIG. 15B shows a release processing example in the unconscious imaging setting. That is, FIG. 15B shows release processing in Step F109 in FIG. 10 (F124 in FIGS. 11A and 11B).

In this case, the control unit 27 causes the signal processing unit 24 to obtain (extract) one frame as captured image data to be recorded as a stationary image in Step F191. Then, the control unit 27 causes the signal processing unit to execute recording processing on the image data of the one frame in Step F192. That is, the signal processing unit 24 is caused to perform predetermined processing so as to obtain the stationary image data for recording the extracted one frame and transfer the stationary image data to the encoding/decoding unit 25. Then, the encoding/decoding unit 25 is caused to execute compression encoding and the like for recording, and the media controller 26 records the stationary image data in the memory card 40.

That is, the strobe light is not emitted regardless of the strobe light emission mode in the processing in FIG. 15B. Moreover, release sound is not generated.

It is possible to implement imaging which a person as an object is not conscious of, which does not disturb the atmosphere in the automatic stationary imaging mode by differently setting the release processing control schemes as shown in FIGS. 15A and 15B. On the other hand, an appropriate imaging operation is performed with release sound or electronic light emission in manual imaging or in imaging in the request correspondence imaging mode.

In addition, the release processing in FIGS. 15A and 15B and the release processing in FIGS. 14A to 14C may be combined. That is, the release processing in FIG. 15A is performed in the normal imaging setting. The processing shown in FIG. 14B or 14C is performed in the unconscious imaging setting, which is an example of processing without performing strobe light emission or release sound generation.

In addition, it can also be considered that the AF illuminator is turned off as an example of the unnoticeable setting. During the automatic focusing control, the AF illuminator light emitting unit 39 is caused to emit light for easy control as described above. This light emission of the AF illuminator is performed in the normal imaging setting and is not performed in the unconscious imaging setting. With such a configuration, it is possible that a user is not conscious of the imaging operation during the imaging in the automatic stationary image mode.

Although specific examples of the setting contents in the normal imaging setting and in the unconscious imaging setting were shown as described above, it is matter of course that the present disclosure is not limited thereto.

Particularly, various setting examples can be considered for the reduction of blur of the object, reduction of the possibility of weird facial expression, and the unnoticeable operation in the unconscious imaging setting. In addition, it is matter of course that various combinations of the above setting can also be considered.

<5. Modification Examples of Functional Configuration>

Above description was made of processing examples according to embodiments basically as control processing based on the functional configuration in FIG. 9.

For example, another functional configuration other than that in FIG. 9 can also be considered for the imaging system including the digital still camera 1 and the camera platform 10.

Figure 16:
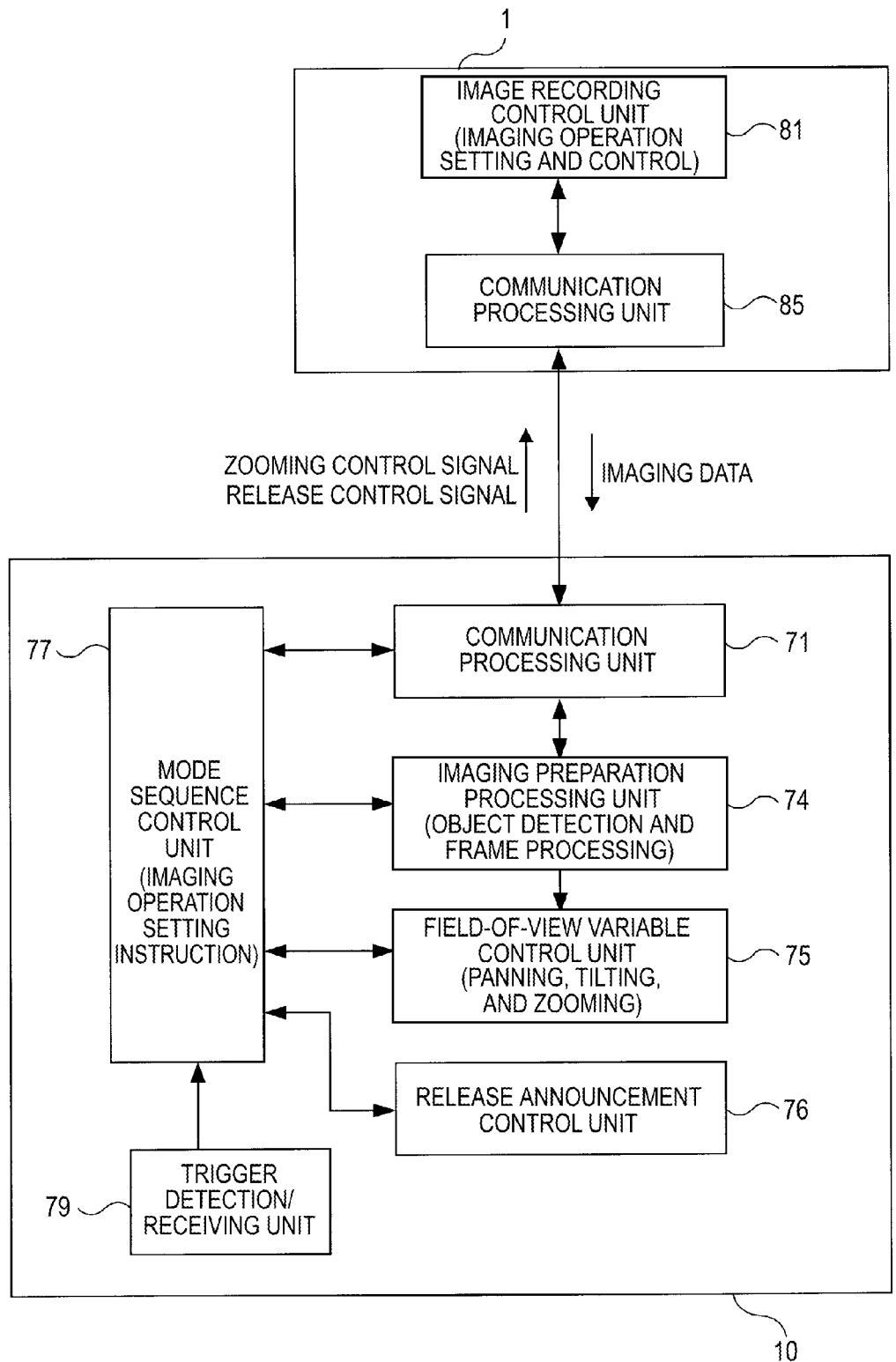
FIG. 16 is an explanatory diagram of another configuration of control functions according to an embodiment.

FIG. 16 shows an example in which the digital still camera 1 side includes only the image recording control unit 81 and the communication processing unit 85. In addition, the camera platform 10 (control unit 51) side is provided with the communication processing unit 71, the trigger detection/receiving unit 79, the imaging preparation processing unit 74, the field-of-view variable control unit 75, the release announcement control unit 76, and the mode sequence control unit 77.

The control processing performed by each functional part is basically the same as that described above with reference to FIG. 10 while the control processing is different in the following point.

The imaging preparation processing unit 74 receives the supply of the captured image data as each frame image from the signal processing unit 24 of the digital still camera 1 in order to perform the object detection processing and the composition processing. Then, the imaging preparation processing unit 74 performs the image analysis and the same object detection processing and the composition processing as those described above.

The field-of-view variable control unit 75 controls the pan driving unit 55 and the tilt driving unit 58 in accordance with the instruction from the imaging preparation processing unit 74 to cause them to execute panning and tilting operations for object detection and composition matching.

In addition, the imaging preparation processing unit 74 outputs the zooming control signal to the control unit 27 (the image recording control unit 81) on the digital still camera 1 side through the communication processing unit 71 for zooming control. The image recording control unit 81 controls the zoom processing for composition matching based on the zooming control signal.

In addition, the mode sequence control unit 77 instructs each functional part in order to cause it to perform processing sequence in FIG. 10, for example and instructs the normal imaging setting or the unconscious imaging setting to the image recording control unit 81 through the communication processing units 71 and 85. Particularly, the functional configuration in FIG. 16 is a configuration example on the assumption of the state in which the digital still camera 1 is attached to the camera platform 10, the operation control for automatic imaging in Steps F108 to F115 in FIG. 10 is performed. That is, the mode sequence control unit 77 instructs the unconscious imaging setting during the automatic stationary imaging mode and instructs the normal imaging setting during the request correspondence imaging mode.

In addition, the mode sequence control unit 77 outputs the release control signal to the control unit 27 (image recording control unit 81) on the digital still camera 1 side through the communication processing unit 71 when the release processing in Steps F109 and F119 in FIG. 10 is performed. The image recording control unit 81 controls the stationary image recording operation in accordance with the release control signal.

The trigger detection/receiving unit 79 detects a trigger input. When the trigger detection/receiving unit 79 detects the trigger input, the trigger detection/receiving unit 79 receives the trigger input as a trigger to the request correspondence imaging mode.

In addition, when the release announcement processing is performed, the mode sequence control unit 86 instructs the release announcement control unit 76 to perform the release announcement operation. In response to this, the release announcement control unit 76 controls the operation of the release announcement execution unit 64 on the camera platform 10 side or control a predetermined action through panning and tilting operations.

As shown in FIG. 16, for example, an example can also be considered in which control for switching the imaging operation setting of the digital still camera 1 is performed mainly on the camera platform 10 side. This is an example in which in the imaging system including the digital still camera 1 and the camera platform 10, the control units 27 and 51 cooperate to implement the imaging control apparatus according to the present disclosure.

Moreover, as a modification example of the configuration of FIG. 16, it is also applicable that the function as the image recording control unit 81 is added to the control unit 51 side of the camera platform 10. In such a case, the camera platform 10 functions as an imaging control apparatus for the digital still camera 1.

Moreover, it is matter of course that the digital still camera 1 can also be used in the state in which it is not attached to the camera platform 10. Alternatively, a digital still camera 1 which is not compatible with the camera platform 10 (attachment or interlocking is not available) is also assumed.

In such a case, the control unit 27 may be provided with functional configurations as the image recording control unit 81 and the mode sequence control unit 86 shown in FIG. 9. That is, a configuration is applicable as long as a processing function of setting the normal imaging setting for manual imaging and setting the unconscious imaging setting for automatic imaging is provided.

As can be understood from the above description, the imaging control apparatus according to the present disclosure is implemented as a device having functions as the image recording control unit 81 and the mode sequence control unit 86 (77).

In addition, the imaging control apparatus according to the present disclosure can also be implemented as a control function configuration installed in the digital still camera 1 or as a control function configuration of the imaging system including the digital still camera 1 and the camera platform 10. As the functional configuration installed in the digital still camera 1, both a functional configuration of executing the automatic stationary imaging in cooperation with the camera platform 10 and a functional configuration without the cooperation function with the camera platform 10 are applicable. Moreover, the imaging control apparatus can also be implemented as a control function configuration installed in the camera platform 10.

Accordingly, both a digital still camera 1 which can be attached to the camera platform 10 and a digital still camera 1 which is not compatible with the camera platform 10 can be a product which implements the imaging control apparatus or the imaging control method according to the present disclosure. In addition, the imaging system including a set of the digital still camera 1 and the camera platform 10 or only the camera platform 10 can also be a product which implements the imaging control apparatus or the imaging control method according to the present disclosure.

Figure 17:
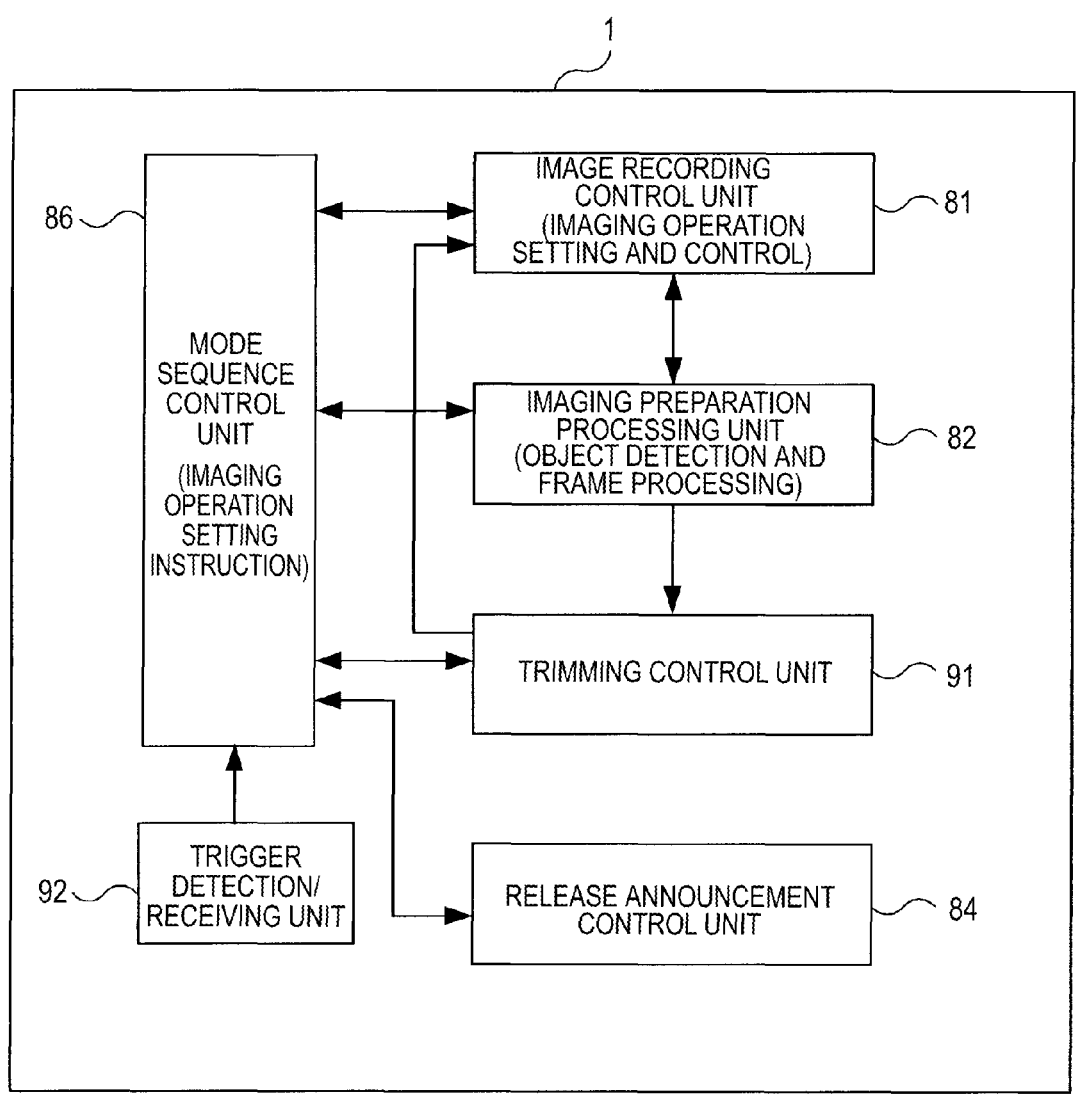
FIG. 17 is an explanatory diagram of a still another configuration of control functions according to an embodiment.

FIG. 17 shows still another functional configuration example.

This drawing shows a configuration example including only the digital still camera 1. Here, an example is shown in which the digital still camera 1 has a function as the trimming control unit 91 instead of the field-of-view variable control unit 83 in FIG. 9. In addition, the trigger detection/receiving unit 92 is a functional part provided with the functions as the trigger receiving unit 89 and the trigger detection unit 73 in FIG. 9.

The trimming control unit 91 instructs a trimming range for the captured image data. For example, the signal processing unit 24 of the digital still camera 1 shown in FIG. 7 is provided with a function of performing trimming processing on the captured image data and generating the stationary image data to be recorded. The trimming control unit 91 has a function of setting this trimming processing range and instructing the trimming processing range to the signal processing unit 24 through the image recording control unit 81.

For example, when panning and tilting by the camera platform 10 are not performed, the captured image data within the field of view does not necessarily have a preferable composition. That is, it is difficult to adjust the composition to obtain a preferable composition state.

Thus, when the camera platform 10 is not used, the imaging preparation processing unit 82 analyses the captured image data within the field of view, performs object detection, and calculates cut range of the image having an optimal composition. That is, specification is made to find which image part with a predetermined aspect ratio in the captured image data corresponds to an optimal composition.

The trimming control unit 91 generates trimming control information instructing the trimming of the part based on the information regarding the range of the optimal composition, supplies the trimming control information to the signal processing unit 24, and causes the signal processing unit 24 to perform necessary trimming processing.

The signal processing unit 24 performs trimming processing on the captured image data obtained at release timing based on the trimming control information and outputs the captured image data to the encoding/decoding unit 25 as the stationary image data to be recorded.

That is, in this configuration example, the stationary image data with an optimal composition is generated not by panning and tilting but by cutting of the captured image data.

Such trimming processing makes it possible to obtain stationary image data with an appropriate composition through automatic imaging only by the digital still camera 1 without the use of the camera platform 10.

In addition, it is also applicable that a trimming processing unit 91 is provided in addition to the functional configuration in FIG. 9 or 16 instead of this configuration example in FIG. 17. That is, it is also applicable to perform optimal composition setting through trimming in addition to the panning and tilting operation even when a set of the camera platform 10 and the digital still camera 1 is used.

Although FIGS. 9, 16, and 17 show blocks of the control function parts, it is not necessary that they are configured as respectively independent program modules or hardware. A configuration is applicable as long as the processing operations in FIG. 10 and the like can be implemented as overall processing of these control function part in practice.

<6. Program>

The program according to an embodiment is a program which causes a computation processing apparatus (the control unit 27, or the like) such as CPU or the like to perform the processing of switching the imaging operation setting according to the aforementioned embodiment, for example, the setting switch processing exemplified in FIGS. 10 to 15B.

The program according to an embodiment causes the computation processing apparatus to perform the stationary imaging control in the normal imaging setting in the case of the stationary imaging operation performed in accordance with a predetermined imaging instruction input by an operator or a person as an object. In addition, the program causes the computation processing apparatus to perform the stationary imaging control in the unconscious imaging setting in the case of the stationary imaging operation performed independently from the predetermined imaging instruction input.

Such a program according to an embodiment can be recorded in advance in an HDD incorporated as a recording medium in a device such as a personal computer, a digital still camera 1, the camera platform 10, or the like, or a ROM or the like in a microcomputer having a CPU.

Alternatively, such a program can temporarily or permanently stored (recorded) in a removable recording medium such as a flexible disc, a CD-ROM (Compact Disc Read Only Memory), an MO (Magnet Optical) disc, a DVD (Digital Versatile Disc), a blu-ray disc, a magnet disc, a semiconductor memory, a memory card, or the like. Such a removable recording medium can be provided as so-called package software.

In addition, the program according to an embodiment can be installed from a removable recording medium to a personal computer or the like or downloaded from download sites through network such as LAN (Local Area Network), the Internet, or the like.

Moreover, the program according to an embodiment is suitable for implementing and widely providing the imaging apparatus and the imaging system which implement the processing of the above embodiments.

The present disclosure contains subject matter related to that disclosed in Japanese Priority Patent Application JP 2010-152909 filed in the Japan Patent Office on Jul. 5, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
    an attachment assembly configured to attach the imaging apparatus to a movable-mechanical-section controlling device; and
    a Central Processing Unit (CPU) configured to set one of
        a first image capturing mode for the imaging apparatus, or
        a second image capturing mode for the imaging apparatus,
    wherein the second image capturing mode is dedicated for automatic image capture based on a lack of an input for an imaging instruction by a user,
    wherein a shutter speed is changed based on a range of light intensity in the first image capturing mode and International Standards Organization (ISO) sensitivity is changed based on a level of the light intensity in the second image capturing mode,
    wherein the range of the light intensity is a range between a first level of the light intensity and a second level of the light intensity,
    wherein the shutter speed is lowered from a first speed to a second speed in the first image capturing mode based on the light intensity that is changed from the first level of the light intensity to the second level of the light intensity,
    wherein the ISO sensitivity is increased to a threshold level in the second image capturing mode based on the shutter speed that is at a third speed,
    wherein the third speed corresponds to a third level of the light intensity,
    wherein the third level of the light intensity is lower than the first level of the light intensity and higher than the second level of the light intensity,
    wherein the third speed is lower than the first speed and higher than the second speed,
    wherein the threshold level of the ISO sensitivity corresponds to a fourth level of the light intensity,
    wherein the fourth level of the light intensity is lower than the second level of the light intensity, and
    wherein, based on the ISO sensitivity that is at the threshold level, the shutter speed is lowered from the third speed based on a decrease in the light intensity from the fourth level of the light intensity.

2. The imaging apparatus of claim 1,
    wherein the CPU is further configured to select a control scheme based on the imaging apparatus that is configured in the second image capturing mode in which at least one image subject is unaware of image capture.

3. The imaging apparatus of claim 1,
    wherein the CPU is further configured to control an image recording operation based on an exposure adjustment operation,
    wherein the exposure adjustment operation in the first image capturing mode raises the ISO sensitivity, at a stage in which the shutter speed is lowered to the second speed, based on a decrease in the light intensity from the second level of the light intensity, and wherein the exposure adjustment operation in the second image capturing mode raises the ISO sensitivity, at a stage in which the shutter speed is lowered to the third speed, based on a decrease in the light intensity from the third level of the light intensity.

4. The imaging apparatus of claim 3,
wherein the CPU is further configured to control the image recording operation based on the ISO sensitivity, and
wherein the ISO sensitivity is higher for the light intensity beyond the second level of the light intensity in the second image capturing mode than in the first image capturing mode.

5. The imaging apparatus of claim 1, wherein the CPU is further configured to control an image recording operation in the second image capturing mode so that image data corresponding to a plurality of frames is superimposed to reduce noise.

6. The imaging apparatus of claim 1, wherein the CPU is further configured to control an image recording operation in the second image capturing mode so that image data corresponding to a plurality of frames is analyzed based on at least one selection criteria to select desired image data.

7. The imaging apparatus of claim 6, wherein the at least one selection criteria is based at least in part on an aspect of a face.

8. The imaging apparatus of claim 1, wherein the first image capturing mode is a setting operation in which a sound is generated at or around an imaging time, and wherein the second image capturing mode is a setting operation with a lack of generation of the sound at or around the imaging time.

9. The imaging apparatus of claim 1, wherein the first image capturing mode is a setting operation in which light is emitted at or around an imaging time, and wherein second image capturing mode is a setting operation with a lack of emission of the light at or around the imaging time.

10. The imaging apparatus of claim 1, wherein the CPU is further configured to detect a trigger input, wherein the trigger input is indicative of a change from an automatic imaging mode to a correspondence imaging mode.

11. The imaging apparatus of claim 10, wherein the CPU is further configured to execute the first image capturing mode based on the detection of the trigger input.

12. The imaging apparatus of claim 1, further comprising:
a camera housing; and
a camera platform comprising at least one mating feature configured to engage with the camera housing,
wherein the camera platform is configured to control an orientation of the camera housing.

13. The imaging apparatus of claim 12, wherein the camera housing encases the CPU.

14. The imaging apparatus of claim 12, wherein the camera platform houses a panning and tilting control unit configured to at least one of pan or tilt the camera housing for object detection in an automatic imaging mode corresponding to the second image capturing mode.

15. The imaging apparatus of claim 12, wherein the camera housing encases a trigger receiving unit configured to receive a trigger input, wherein the trigger input is indicative of a change from an automatic imaging mode to a correspondence imaging mode, and
wherein the camera platform comprises a trigger detection unit configured to detect the trigger input and send a trigger detection signal to the trigger receiving unit based on the detected trigger input.

16. The imaging apparatus of claim 15, wherein the trigger detection unit is further configured to determine a trigger input direction of the detected trigger input.

17. An imaging method, comprising:
setting an image capturing mode for an imaging apparatus attached to a movable-mechanical-section controlling device,
wherein one of a first image capturing mode or a second image capturing mode dedicated for automatic image capturing based on a lack of an input for an imaging instruction by a user is set,
wherein a shutter speed is changed based on a range of light intensity in the first image capturing mode and International Standards Organization (ISO) sensitivity is changed based on a level of the light intensity in the second image capturing mode,
wherein the range of the light intensity is a range between a first level of the light intensity and a second level of the light intensity,
wherein the shutter speed is lowered from a first speed to a second speed in the first image capturing mode based on the light intensity that is changed from the first level of the light intensity to the second level of the light intensity,
wherein the ISO sensitivity is increased to a threshold level in the second image capturing mode based on the shutter speed that is at a third speed,
wherein the third speed corresponds to a third level of the light intensity,
wherein the third level of the light intensity is lower than the first level of the light intensity and higher than the second level of the light intensity,
wherein the third speed is lower than the first speed and higher than the second speed,
wherein the threshold level of the ISO sensitivity corresponds to a fourth level of the light intensity,
wherein the fourth level of the light intensity is lower than the second level of the light intensity, and
wherein, based on the ISO sensitivity that is at the threshold level, the shutter speed is lowered from the third speed based on a decrease in the light intensity from the fourth level of the light intensity.

18. A non-transitory computer-readable medium having stored thereon computer-executable instructions, which when executed by a computer, cause the computer to execute operations, the operations comprising:
setting an image capturing mode for an imaging apparatus attached to a movable-mechanical-section controlling device,
wherein one of a first image capturing mode or a second image capturing mode dedicated for automatic image capturing based on a lack of an input for an imaging instruction by a user is set,
wherein a shutter speed is changed based on a range of light intensity in the first image capturing mode and International Standards Organization (ISO) sensitivity is changed based on a level of the light intensity in the second image capturing mode,
wherein the range of the light intensity is a range between a first level of the light intensity and a second level of the light intensity,
wherein the shutter speed is lowered from a first speed to a second speed in the first image capturing mode based on the light intensity that is changed from the first level of the light intensity to the second level of the light intensity, wherein the ISO sensitivity is increased to a threshold level in the second image capturing mode based on the shutter speed that is at a third speed, wherein the third speed corresponds to a third level of the light intensity, wherein the third level of the light intensity is lower than the first level of the light intensity and higher than the second level of the light intensity, wherein the third speed is lower than the first speed and higher than the second speed, wherein the threshold level of the ISO sensitivity corresponds to a fourth level of the light intensity, wherein the fourth level of the light intensity is lower than the second level of the light intensity, and wherein, based on the ISO sensitivity that is at the threshold level, the shutter speed is lowered from the third speed based on a decrease in the light intensity from the fourth level of the light intensity.

19. The imaging apparatus of claim 1, wherein the CPU is further configured to set a release timing to capture a plurality of images, in the second image capturing mode based on the lack of the input by the user, based on detection of a state of at least one object that is captured.

20. The imaging apparatus of claim 1, wherein the second image capturing mode comprises an setting imaging operation that reduces blur of at least one object in a plurality of images.

21. The imaging apparatus of claim 1, wherein the CPU is further configured to control an image recording operation based on the shutter speed.

22. The imaging apparatus of claim 1, wherein an image is captured based on the input by the user in the first image capturing mode and a plurality of images are automatically captured based on the lack of the input by the user in the second image capturing mode.

* * * * *